US011867344B2

(12) United States Patent
Goulet

(10) Patent No.: US 11,867,344 B2
(45) Date of Patent: Jan. 9, 2024

(54) COMPOSITE INSULATION SYSTEM

(71) Applicant: SAPREX, LLC, Gastonia, NC (US)

(72) Inventor: Robert Jacque Goulet, Gastonia, NC (US)

(73) Assignee: NELSON GLOBAL PRODUCTS, INC., Stoughton, WI (US)

( * ) Notice: Subject to any disclaimer, the term of this patent is extended or adjusted under 35 U.S.C. 154(b) by 676 days.

(21) Appl. No.: 16/092,838

(22) PCT Filed: Apr. 17, 2017

(86) PCT No.: PCT/US2017/027994
§ 371 (c)(1),
(2) Date: Oct. 11, 2018

(87) PCT Pub. No.: WO2017/181197
PCT Pub. Date: Oct. 19, 2017

(65) Prior Publication Data
US 2019/0120419 A1   Apr. 25, 2019

Related U.S. Application Data

(60) Provisional application No. 62/323,494, filed on Apr. 15, 2016.

(51) Int. Cl.
*F16L 59/02* (2006.01)
*B32B 1/08* (2006.01)
(Continued)

(52) U.S. Cl.
CPC .............. *F16L 59/021* (2013.01); *B32B 1/08* (2013.01); *B32B 5/26* (2013.01); *B32B 7/12* (2013.01);
(Continued)

(58) Field of Classification Search
CPC ......... F16L 59/00; F16L 59/14; F16L 59/143; F16L 59/141; F16L 59/145; F16L 59/15;
(Continued)

(56) References Cited

U.S. PATENT DOCUMENTS 1,717,215 A   6/1929   Huber
2,148,164 A   2/1939   Krippendorf
(Continued)

FOREIGN PATENT DOCUMENTS

CH   675984 A5   11/1990
CN   2120185 U   10/1992
(Continued)

OTHER PUBLICATIONS

Extended European Search Report issued by the European Patent Office for corresponding European Patent Application No. 17783373.8-1010 / 3443254, dated Nov. 27, 2019, 7 pages.
(Continued)

*Primary Examiner* — Lee E Sanderson
(74) *Attorney, Agent, or Firm* — Moore & Van Allen, PLLC; Henry B. Ward, III

(57) ABSTRACT

Embodiments of the present invention provide a self-molding composite system for insulation and covering operations. The self-molding composite system may be cured to form any desired shaped for insulation and covering operations. The composite system comprises one or more layers that may create a rigid layered composite when cured. The one or more layers of the composite system may include at least one structural reinforcement layer that is a braided, knit, or non-woven fiber based substrate, an interstitial matrix layer, and customizable top coat. The customizable top coat may be a solvent based polymer solution that includes various additives that may include color pigments, additives for additional abrasion protection, additives for
(Continued)

thermal protection, and/or additives for creating various textures or visible appearances to the composite system.

16 Claims, 9 Drawing Sheets

(51) Int. Cl.
  *B32B 5/26* (2006.01)
  *B32B 7/12* (2006.01)
  *F16L 59/14* (2006.01)
  *F16L 5/14* (2006.01)

(52) U.S. Cl.
  CPC ........... *F16L 5/14* (2013.01); *B32B 2307/304* (2013.01); *B32B 2597/00* (2013.01)

(58) Field of Classification Search
  CPC ........ F16L 59/153; F16L 59/02; B41N 10/04; C08J 5/24; B29C 70/04; B29C 70/06; B29C 61/06; B29C 61/0608; B29C 61/0616; B29C 61/0633; B29C 61/065; D10B 2505/02; D10B 2401/061; F01N 13/14; F01N 13/148; B60R 13/08; D03D 1/0035; D03D 1/0041; D03D 1/0043; D03D 1/0047; D03D 1/0052; D03D 1/0058; D03D 1/0064; D03D 1/0007; D03D 3/02; D04B 1/225; D04B 9/44; B32B 5/26; D04C 1/02
  USPC .............................................. 428/36.9, 36.91
  See application file for complete search history.

(56) References Cited

U.S. PATENT DOCUMENTS

| | | | |
|---|---|---|---|
| 2,688,895 A | 9/1954 | Houghton | |
| 2,924,546 A | 2/1960 | Shaw | |
| 3,053,715 A | 9/1962 | Labino | |
| 3,092,530 A | 6/1963 | Plummer | |
| 3,312,250 A | 4/1967 | Sirignano et al. | |
| 3,616,123 A * | 10/1971 | Reynolds, Jr. | B29C 66/1122 428/222 |
| 3,652,375 A | 3/1972 | Johnson | |
| 3,828,119 A * | 8/1974 | Warburton | H01B 7/292 174/121 A |
| 4,026,381 A | 5/1977 | Conley | |
| 4,054,710 A * | 10/1977 | Botsolas | B29C 70/00 442/31 |
| 4,282,284 A | 8/1981 | George | |
| 4,299,884 A | 11/1981 | Payen | |
| 4,428,999 A | 1/1984 | George et al. | |
| 4,655,866 A | 4/1987 | Ferrier | |
| 4,870,887 A | 10/1989 | Tresslar et al. | |
| 5,092,122 A | 3/1992 | Bainbridge | |
| 5,134,846 A | 8/1992 | White | |
| 5,256,459 A * | 10/1993 | Carlson | B41F 27/105 101/368 |
| 5,274,196 A | 12/1993 | Weinberg | |
| 5,343,895 A | 9/1994 | King et al. | |
| 5,413,149 A | 5/1995 | Ford et al. | |
| 5,549,947 A | 8/1996 | Quigley et al. | |
| 5,556,677 A | 9/1996 | Quigley et al. | |
| 5,615,711 A | 4/1997 | Lewis | |
| 5,617,900 A | 4/1997 | Weil | |
| 5,639,552 A | 6/1997 | Fukushima et al. | |
| 5,660,899 A | 8/1997 | Rockney et al. | |
| 5,712,010 A | 1/1998 | Russek et al. | |
| 5,795,835 A | 8/1998 | Bruner et al. | |
| 5,849,379 A | 12/1998 | Gladfelter et al. | |
| 5,972,512 A | 10/1999 | Boisvert et al. | |
| 5,974,784 A | 11/1999 | Feldman | |
| 5,985,385 A | 11/1999 | Gottfried | |
| 6,045,884 A | 4/2000 | Hess et al. | |
| 6,250,193 B1 * | 6/2001 | Head | B29C 70/222 87/2 |
| 6,276,401 B1 | 8/2001 | Wilson | |
| 6,527,015 B2 | 3/2003 | Lively | |
| 6,572,723 B1 | 6/2003 | Tilton et al. | |
| 6,610,928 B2 | 8/2003 | Synder | |
| 6,769,455 B2 | 8/2004 | Toas et al. | |
| 6,978,643 B2 | 12/2005 | Akers et al. | |
| 7,007,720 B1 | 3/2006 | Chase et al. | |
| 7,152,633 B2 | 12/2006 | White | |
| 7,544,890 B2 | 6/2009 | Herborth et al. | |
| 8,950,168 B2 | 2/2015 | Heitmann et al. | |
| 9,145,627 B2 | 9/2015 | Wilson et al. | |
| 9,388,515 B2 | 7/2016 | Goulet | |
| 9,976,687 B2 | 5/2018 | Goulet | |
| 10,293,544 B2 | 5/2019 | Goulet | |
| 10,295,109 B2 | 5/2019 | Goulet | |
| 10,591,104 B2 | 3/2020 | Goulet | |
| 2002/0168488 A1 | 11/2002 | Gladfelter et al. | |
| 2005/0155663 A1 | 7/2005 | Dhellemmes et al. | |
| 2006/0229381 A1 | 10/2006 | Bartko | |
| 2007/0049148 A1 | 3/2007 | Chien et al. | |
| 2007/0131299 A1 | 6/2007 | Kornbleet | |
| 2007/0251595 A1 | 11/2007 | Chen | |
| 2008/0017263 A1 | 1/2008 | Robinson | |
| 2009/0050256 A1 | 2/2009 | Green et al. | |
| 2009/0078499 A1 | 3/2009 | Sikes et al. | |
| 2009/0197044 A1 | 8/2009 | Pelzer et al. | |
| 2009/0277526 A1 | 11/2009 | Merry | |
| 2010/0139197 A1 | 6/2010 | Woodhall | |
| 2010/0154916 A1 | 6/2010 | Jackson et al. | |
| 2010/0154917 A1 | 6/2010 | Batallas et al. | |
| 2010/0201023 A1 | 8/2010 | Piccione et al. | |
| 2010/0263761 A1 | 10/2010 | Niccolls et al. | |
| 2010/0316822 A1 | 12/2010 | Malloy | |
| 2011/0000572 A1 | 1/2011 | Ramaswamy et al. | |
| 2012/0082807 A1 | 4/2012 | Malloy et al. | |
| 2012/0149268 A1 | 6/2012 | Lake et al. | |
| 2012/0291903 A1 | 11/2012 | Ekelund et al. | |
| 2013/0097839 A1 | 4/2013 | Latham et al. | |
| 2013/0299035 A1 | 11/2013 | Laurent et al. | |
| 2013/0306186 A1 | 11/2013 | Goulet | |
| 2014/0020766 A1 | 1/2014 | Kremers | |
| 2014/0094077 A1 | 4/2014 | Goulet | |
| 2015/0000259 A1 | 1/2015 | Dietz | |
| 2016/0311152 A1 | 10/2016 | Goulet | |
| 2018/0023222 A1 | 1/2018 | Zhang et al. | |
| 2020/0217443 A1 | 7/2020 | Lubenow et al. | |
| 2020/0217444 A1 | 7/2020 | Goulet | |

FOREIGN PATENT DOCUMENTS

| | | |
|---|---|---|
| CN | 101119042 A | 2/2008 |
| CN | 101848959 A | 9/2010 |
| CN | 102575115 A | 7/2012 |
| CN | 102654219 A | 9/2012 |
| CN | 109073134 A | 4/2017 |
| CN | 109073134 A | 12/2018 |
| DE | 102010028433 A1 | 11/2011 |
| EP | 0327148 A1 | 8/1989 |
| EP | 0877892 B1 | 11/1999 |
| EP | 1772604 A1 | 4/2007 |
| GB | 2166512 A | 5/1986 |
| JP | 07269340 A | 10/1995 |
| JP | 2001289392 A | 10/2001 |
| JP | 2005513226 A | 5/2005 |
| JP | 2005163830 A | 6/2005 |
| JP | 3183361 U | 5/2013 |
| RU | 2303744 C2 | 7/2007 |
| RU | 2380606 C2 | 1/2010 |
| RU | 2438065 C2 | 12/2011 |
| WO | 9732067 A1 | 9/1997 |
| WO | 2000073695 A1 | 12/2000 |

(56) References Cited

FOREIGN PATENT DOCUMENTS

| WO | 2005085608 A1 | 9/2005 |
|---|---|---|
| WO | 2017181197 A1 | 10/2017 |

OTHER PUBLICATIONS

Chinese Office Action issued by the Chinese Patent Office for corresponding Chinese Patent Application No. 2017800265042, dated Dec. 19, 2019, 12 pages.
Chinese Search Report issued by the Chinese Patent Office for corresponding Chinese Patent Application No. 2017800265042, dated Dec. 11, 2019, 5 pages.
Japanese Office Action issued by the Japanese Patent Office for corresponding Japanese Patent Application No. 2019505340, dated Jan. 15, 2020, 16 pages.
Decision to Grant issued by the Federal Service for Intellectual Property for corresponding Russian Patent Application No. 2018140073/06(066643) dated Jun. 17, 2020, 5 pages.
Supplementary European Search Report issued by the European Patent Office for corresponding Application EP 17871914 dated Jul. 8, 2020.
Office Action issued by the Japanese Patent Office for corresponding Japanese Patent Application No. 2019-527220, dated Aug. 21, 2020.
Chinese Search Report issued by the Chinese Patent Office for Chinese Patent Application No. 201780083881X, dated Sep. 23, 2020.
Chinese Office Action issued by the Chinese Patent Office for Chinese Patent Application No. 201780083881X, dated Sep. 28, 2020.
Russian Office Action issued by the Patent Office of the Russian Federation for corresponding Russian Patent Application No. 2019118633, dated Nov. 28, 2019, 14 pages.
Russian Search Report issued by the Patent Office of the Russian Federation for corresponding Russian Patent Application No. 2019118633, dated Nov. 22, 2019, 2 pages.
Canadian Office Action issued by the Canadian Patent Office for Canadian Patent Application No. 3,060,052, dated Dec. 9, 2020.
European Office Action issued by the European Patent Office for European Patent Application No. 17783373.8, dated Mar. 9, 2021.
Saprex, LLC, International Patent Application No. PCT/US2017/062573, International Search Report, dated Jan. 30, 2018.
Saprex, LLC, International Patent Application No. PCT/US2017/062573, Written Opinion, dated Jan. 30, 2018.
Saprex, LLC, International Patent Application No. PCT/US2017/062573, International Preliminary Report on Patentability, dated May 21, 2019.
Saprex, LLC, Russian Patent Application No. 2018140073, Office Action, dated May 17, 2019.
Bondaletova, L. and Bondaletov, V., "Polymer composition materials", part I, Tomsk, 2013, pp. 16-63.
International Search Report dated Jul. 5, 2017, for related International Patent Application No. PCT/US2017/027994.
Written Opinion dated Jul. 5, 2017, for related International Patent Application No. PCT/US2017/027994.
International Preliminary Report on Patentability dated Oct. 16, 2018, for related International Patent Application No. PCT/US2017/027994.
Office Action issued by the Brazilian Patent Office for Brazilian Application No. BR112018070774-0, dated Jun. 7, 2021.
Office Action issued by the European Patent Office for European Patent Application No. 17 871 914.2, dated Jun. 17, 2021.
Office Action issued by the Canadian Patent Office for Canadian Patent Application No. 3,082,881, dated Aug. 11, 2021.
Examination Search Report issued by the Canadian Patent Office for Canadian Patent Application No. 3,082,881, dated Jul. 16, 2021.
Office Action issued by the Brazilian Patent Office for Patent Application No. BR112019010119-5, dated Aug. 31, 2021.
Second Office Action issued by the Chinese Patent Office for Chinese Patent Application No. 201780083881.X, dated Jul. 12, 2021.
Final Rejection issued by the United States Patent Office for U.S. Appl. No. 16/818,395, dated Nov. 10, 2021.
Office Action issued by the United States Patent and Trademark Office for U.S. Appl. No. 16/413,353, dated Jun. 16, 2021.
Final rejection issued by the United States Patent and Trademark Office for U.S. Appl. No. 16/413,353, dated Mar. 18, 2022.
Office Action issued by the European Patent Office for European Patent Application No. 17 871 914.2, dated Apr. 13, 2022.
Office Action issued by the United States Patent Office for U.S. Appl. No. 16/413,353, dated Jul. 5, 2022.
Final office action issued by the United States patent and trademark office for U.S. Appl. No. 16/818,395, dated Mar. 8, 2021.
Notice of allowance issued by the United States patent and trademark office for U.S. Appl. No. 16/818,395, dated Mar. 24, 2021.
International search report dated Sep. 20, 2013, for related international patent application No. PCT/US2013/041391.
Written opinion dated Sep. 20, 2013, for related international patent application No. PCT/US2013/041391.
International preliminary report on patentability dated Nov. 18, 2014, for related international patent No. PCT/US2013/041391.
Office Action issued by the United States Patent Office for U.S. Appl. No. 16/462,115, dated Jan. 13, 2022.
Final Rejection issued by the United States Patent Office for U.S. Appl. No. 16/462,115, dated May 13, 2022.
Office Action issued by the European Patent Office for European Patent Application No. 17 783 373.8, dated Oct. 20, 2022.
Office Action issued by the Brazilian Patent Office for Brazilian Patent Application No. BR112019010119-5, dated Oct. 27, 2022.
Office Action issued by the United States Patent Office for U.S. Appl. No. 16/413,353, dated Nov. 29, 2022.
Office Action issued by the Brazilian Patent Office for Brazilian Patent Application No. BR112018070774-0, dated Jan. 11, 2023.
Office Action issued by the European Patent Office for European Patent Application No. 17 871 914.2, dated Jan. 31, 2023.
Notice of Allowance issued by the United States Patent and Trademark Office for U.S. Appl. No. 16/818,395, dated Feb. 23, 2023.
Corrected Notice of Allowance issued by the United States Patent and Trademark Office for U.S. Appl. No. 16/818,395, dated Mar. 9, 2023.

* cited by examiner

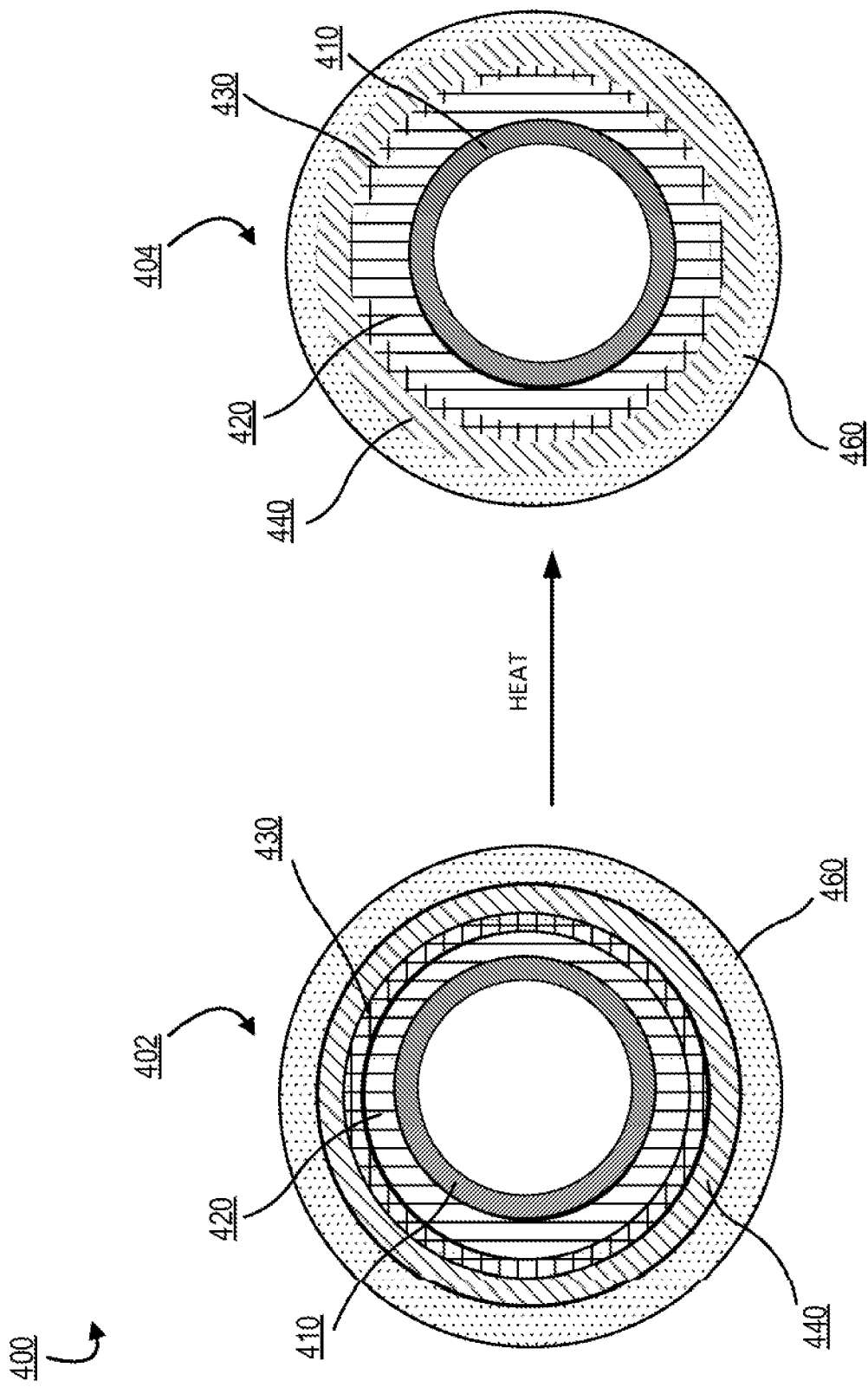

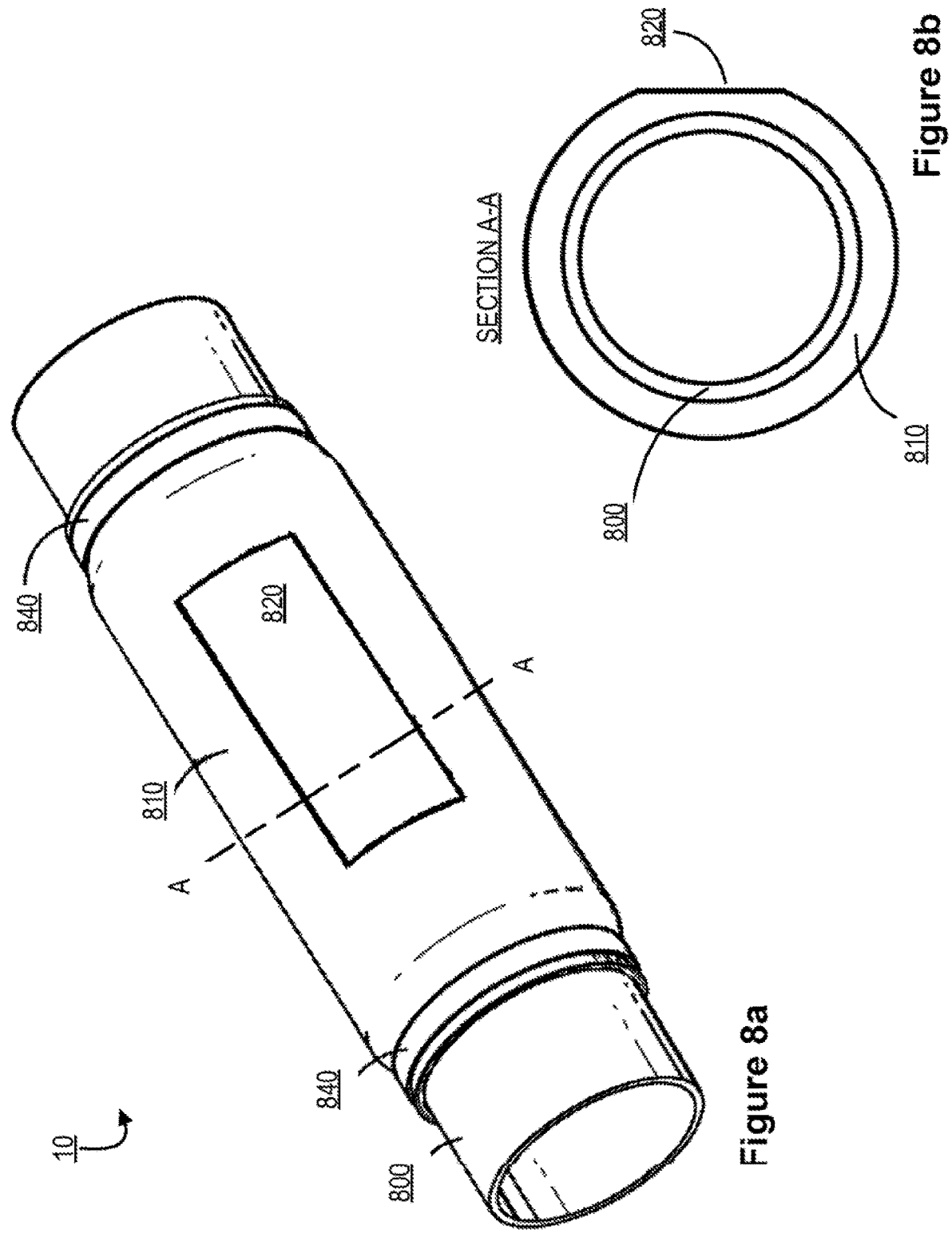

COMPOSITE INSULATION SYSTEM

FIELD OF THE INVENTION

The present invention typically relates to, in general, a customizable pipe insulation system for industrial, automotive and recreational vehicle applications that involve transport of fluids through pipes and ducts.

BACKGROUND

Insulated pipes in the industrial and transportation sectors often are unique to a particular application and they are often low volume parts with annual requirements below a thousand units per year. In many applications, the insulation is required to be manufactured specifically for the desired pipe geometry and the specific insulation requirements of the application. Typically, the insulation is not flexible or adaptable for different configurations. Often the insulation is required to perform thermal insulation, pipe protection, be astatically acceptable and be durable for long durations. Current methods typically require part specific tooling or manually intensive installation methods and typically do not perform at the desired level in one or more areas. Often pipe insulation is uniform throughout the part to minimize application complexity, yet the thermal loss exhibited throughout the system is non-uniform.

Furthermore, automotive and industrial piping typically comprise complex shapes, reductions, or the like in order to be directed into the proper exit point and often any single part is a unique part. Currently, in order to shape insulation around the piping shapes, blankets, wrapped or molded parts are utilized. Blankets are typically custom cut for a specific part and attached via snaps, zippers or straps. Wrapped insulation often involves multiple layers of wrapped materials that is extremely labor intensive. Molded parts are either traditional composite materials or metal foil covered systems that require part specific tooling.

Fiber reinforced composite fabrication involves wetting, mixing or saturating the fibers with the matrix, compacting, forming and curing the composite. Fiber can be introduced in bulk form or in organized manner such as a fabric or tape. Fibers are the discontinuous phase of a fiber-reinforced composite. Matrix is the continuous phase and often based on polymeric materials. Wetting, mixing or saturating the fibers with matrix can be done by a number of methods including applying the material prior to compacting or during compacting or forming. Fiber reinforced composite systems are typically formed to shape and compacted using an external mold that may or may not be reusable. In these applications a mold of the desired shape is premade. The fiber and resin are introduced into the molding system and through, chemical reaction, heat and or pressure the fiber reinforced composite part is formed. Typically, this is done through vacuum bag, autoclave, resin transfer or compression molding.

In fiber reinforced composite molding, it is often convenient to refer to the two parts of the mold as the lower mold and the other as the upper mold. In some applications, it is convenient to refer to an internal and external mold. Lower and upper and internal and external do not necessarily describe the molds configuration, but are used to denote different faces. In molding a tubular part, one may have a cylindrical mandrel as the lower mold and a rigid upper mold to form the fiber reinforced composite to the shape of the mandrel.

Vacuum bag molding of a shaped part typically requires a rigid lower mold and uses a flexible, air impermeable film system as the upper mold. The system is sealed air-tight and a vacuum is draw to create pressure to consolidate the composite during curing.

Autoclave molding uses both a rigid upper and lower mold with each part producing one face of the molded part. In the process the fiber reinforcement and matrix is placed between the mold plates and a vacuum is drawn. Typically heat and pressure are used to cure the part.

Resin Transfer Molding (RTF) uses both a rigid upper and lower mold. In RTF molding, the fiber reinforcement is placed in the mold and the mold is closed. The matrix is injected into the closed mold and the part is cured.

Compression molding is a forming process where a plastic material is placed directly into a heated metal mold, is softened by the heat, and forced to conform to the shape of the mold as the mold closes. The compression molding starts, with an allotted amount of plastic or gelatin placed over or inserted into a mold. Afterward the material is heated to a pliable state in and by the mold. Shortly thereafter a hydraulic press compresses the pliable plastic against the mold, resulting in a molded piece, retaining the shape of the inside surface of the mold. Compression molding is a high-volume, high-pressure method suitable for molding complex, high-strength fiberglass reinforcements.

While a high degree of compression during molding can create a highly consolidated composite with minimal void to maximize strength, this is not always necessary or desirable. In some cases, an acceptable level of performance can be achieved without a high degree of consolidation and other attributes such as cost, manufacturing complexity and time can be optimized. In applications where thermal or sound insulation are desirable, a higher level of void volume may actually be preferred.

Historically, fiber reinforced composites have been limited to high volume and or high cost applications. The cost of molding equipment must either be recovered through a large volume of parts or through high costs for low volume parts.

As a result of the technical knowledge and equipment required in traditional fiber reinforced composites, they are most often utilized by those highly skilled in the trade. It can be supposed that fiber reinforced composites could be more broadly applied if they were easier to use.

Recently, there have been a number of wrapped composite tapes developed. While these overcome the need for a two-part mold, wrapped tapes are subject to a number of issues including inconsistent compression, uneven thickness, discontinuous coverage along the length, tape-edge weakness and poor appearance.

Fiber reinforced composites are used as both piping and as reinforcement to conventional plastic and metal piping. Fiber reinforced composite pipes can be produced via conventional molding techniques and pultrusion. Conventional pipes are most commonly reinforced with wrappable fiber reinforced composites.

Pultrusion is a continuous molding process whereby reinforcing fibers are saturated with liquid polymer resin and formed and pulled through a heated die for form a continuous part such as pipe.

Metal stamping is a process in which a flat or rolled sheet of metal is placed in a stamping press where a tool and die surface are pressed together to form the sheet metal into the desired shape. Metal stamping is typically used to form metal foil covers used in insulating pipes and ducts.

Each of these molding operations requires special equipment and manufacturing capabilities, such as molds, compression equipment, or vacuum equipment and they typically require unique parts for each product produced. In this way, each different exhaust pipe configuration requires a unique set of molds at a significant tooling cost each. In addition, each time the configuration changes a new set of molding plates must built.

Furthermore, the methods currently used in exhaust systems have various limitations. For example, insulation covers tend to rip or fray easily if caught. Resin fiber processing precludes inclusion of additives, such as pigments and the like. Resin fiber rheology is limited to that of the resin fiber production process. Moreover, the amount of resin that can be used to stabilize and strengthen the system is limited by resin fibers.

Therefore, it would desirable to provide a customizable, pipe insulation system that allows simple application to various pipe geometries, easy customization as to the type and level of insulation provided, easily provides the opportunity for variable insulation along the pipe, allows for easy modification of matrix types and distribution within the insulation system, provides for the simple addition of topcoats, is simple to secure to the pipe and curable without the use of external molds.

BRIEF SUMMARY OF THE INVENTION

Embodiments of the present invention addresses the above needs and/or achieve other advantages by providing apparatuses and methods for a customizable, self-molding, fiber-reinforced composite insulation system that is structured to be applied to a component comprising: at least one structural reinforcement layer, the at least one structural reinforcement layer being structured to provide structural support, insulation or protection to the component; a self-molding fiber cover structured to encase the at least one structural reinforcement layer and provide compression around the at least one structural reinforcement layer and at least partially around the component without application of external forces; and a liquid polymer matrix solution structured to be applied to the at least one structural reinforcement layer and the self-molding fiber cover positioned at least partially on the component and to be cured to thereby form the fiber-reinforced composite insulation system. Typically, in some embodiments, the customizable, self-molding, fiber-reinforced composite insulation system that can be easily applied to an individual pipes or efficiently run on high-volume part configurations. The system includes a highly flexible, self-molding cover, at least one structural reinforcement layer or fibrous base layer, one or more highly customizable, matrix systems, optional topcoat and a clamping mechanism all formed on the pipe and cured on the pipe in a single step without the aid of external molds.

In some embodiments, or in combination with any of the above embodiments, the at least one structural reinforcement layer comprises structural fibers, resin fibers and/or elastic fibers, wherein: structural fibers comprise glass, carbon, polymer, ceramic, metallic, mineral and/or natural fibers; and resin fibers comprise polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and/or ethylene-tetrafluoroethylene (ETFE) based fibers.

In some embodiments, or in combination with any of the above embodiments, the at least one structural reinforcement layer comprises braided fiber materials, knit fiber materials, woven fiber materials, and/or non-woven fiber materials.

In some embodiments, or in combination with any of the above embodiments, the at least one structural reinforcement layer comprises polymeric films, metal films, metallized polymeric films, foils, fiber reinforced films and/or fiber reinforced foils.

In some embodiments, or in combination with any of the above embodiments, the self-molding fiber cover comprises braided fiber materials, knit fiber materials, woven fiber materials, and/or non-woven fiber materials.

In some embodiments, or in combination with any of the above embodiments, the self-molding fiber cover comprises structural fibers, resin fibers and/or elastic fibers, wherein: structural fibers comprise glass, carbon, polymer, ceramic, metallic, mineral and/or natural fibers; and resin fibers comprise polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and/or ethylene-tetrafluoroethylene (ETFE) based fibers.

In some embodiments, or in combination with any of the above embodiments, the liquid polymer matrix solution comprises a dispersion of ground thermoplastic polymer in an organic or non-organic solvent.

In some embodiments, or in combination with any of the above embodiments, the liquid polymer matrix solution comprises one or more additives chosen from a group comprising surfactants, emulsifiers, dispersants, rheology modifiers, and functional additives.

In some embodiments, or in combination with any of the above embodiments, the liquid polymer matrix solution comprises a thermoset polymer, wherein thermoset polymer comprises alkyd, amino, epoxy, phenolic, polyimide, polyurethane or silane polymers.

In some embodiments, or in combination with any of the above embodiments, the liquid polymer matrix solution is structured to flow within and at least partially infuse the self-molding fiber cover to create a fiber-reinforced composite.

In some embodiments, or in combination with any of the above embodiments, the liquid polymer matrix solution is structured to flow within and at least partially infuse the at least one structural reinforcement layer to form a multilayer, fiber-reinforced composite.

In some embodiments, or in combination with any of the above embodiments, composite insulation system further comprises one or more metal foil or fiber reinforced metal foil layers chosen from a group comprising aluminum, fiberglass reinforced aluminum, stainless steel, nickel, and tin.

In some embodiments, or in combination with any of the above embodiments, the composite insulation system further comprises a customizable topcoat structured to be applied to the self-molding fiber cover and cured, the customizable topcoat comprising one or more dry ground polymers dissolved in a solvent and an emulsifier.

In some embodiments, or in combination with any of the above embodiments, the liquid polymer matrix solution flows between the at least one structural reinforcement layer and the self-molding fiber cover during curing to create a mechanical and chemical bond between layers of the composite system.

In some embodiments, the composite system is used to insulate automotive, recreational vehicle and industrial pipe and exhaust systems. As such, the system may help retain the internal heat of the pipe's contents. Furthermore, the system may protect surrounding components from the extreme temperatures of the pipes, while also protecting the pipe form rust, corrosion, and damage. The insulation applications may include exhaust insulation covers, pipe insulation covers, machinery or engine covers (such as turbine covers), gun barrel covers, and the like.

In some embodiments, the composite insulation system may also be used in structural applications where the composite system is used to add to or carry the structural load of the system. In these applications the internal mold may remain or be removed after processing. Examples of this application include pipe reinforcement of low strength pipes such as ductwork, HVAC ducting, fluid transfer pipes and cooling tubes.

In some embodiments, the composite system is used to insulate industrial pipes and ducts that carry hot or cold fluids to retain heat, insulation from heat and protect workers and the environment. Fluids can include liquids, gases and mixtures of either and mixtures of either or both with solids.

In some embodiments, the composite system may be used in covering operations. In this way, the self-molding composite system may provide a rigid protection of internal components from external damage, such as weather, abrasion, blunt force, or the like.

In some embodiments, or in combination with any of the above embodiments, the composite system may comprise tubular layers of insulation, structural reinforcement and/or cover materials. The tubular members may have a seam or may be seamless. In other embodiments, layers can be fabricated through material cutting and sewing or other bonding method to create a self-molding system. In yet other embodiments that materials may be fabricated to shape.

In some embodiments, or in combination with any of the above embodiments, the composite system may include at least one fibrous base layer or structural reinforcement layer applied adjacent to the item being insulated or covered. The base layer or structural reinforcement layer may be braided, knit, woven or non-woven or otherwise formed fiber based substrate. In some embodiments, one or more base layers or structural reinforcement layers may be added.

In some embodiments, or in combination with any of the above embodiments, localized insulation layers may be installed to improve localized insulation properties. Localized insulation may be next to the pipe or duct, between other structural reinforcement layers/base layers or between a structural reinforcement layer/base layer and the cover. Localized insulation layers may be non-woven, woven, knit, braided or other fibrous material and may be any size less than complete pipe or duct coverage. Localized insulation may contain materials to aid in adhesion and or installation. Localized insulation may contain matrix or other additives.

In some embodiments, or in combination with any of the above embodiments, the composite system may include self-molding fiber cover, such as a knit cover. The self-molding fiber cover may contain structural, elastic and/or resin fibers. The self-molding fiber cover may contain between 0% and 75% resin fibers depending on desired application. The self-molding fiber cover may contain between 0% and 10% elastic fibers. The interior layer of the self-molding fiber cover fabric may be designed to transform during curing to create a "hook" that is embedded into one or more underlying layers. Typically, the self-molding fiber cover is elastic, spring-like and biased towards its original configuration, to provide compression around the at least one structural reinforcement layer and at least partially around the component without application of external forces. Specifically, the self-molding fiber cover can be expanded from its original configuration to fit or encase the dimensions of the component and any structural reinforcement layers on the component, but will be biased towards its original configuration, which therefore provides a compressive force around the encased at least one structural layer and the component. The self-molding fiber cover may contain glass, ceramic, metal, natural, metal, mineral and/or polymer based fibers in various combinations.

In some embodiments, or in combination with any of the above embodiments, the cover may include a braided, woven or non-woven material or any combinations of 2 or more of these materials. The cover material forms to the shape and maintains its structural integrity during curing. The cover may contain structural, elastic and/or resin fibers. The cover may contain glass, ceramic, natural, metal, mineral and or polymer based fibers in various combinations.

In some embodiments, the self-molding, fiber reinforced composite system comprises a cover and one or more base layers or structural reinforcement layers of fiber material that can be chemically and/or physically bonded together.

In some embodiments, or in combination with any of the above embodiments, there may be one more layers of foil or fiber-reinforced foil next to the structural element being covered. In high-temperature applications exposed to corrosive environments, this may reduce corrosion on the pipe or duct. This layer will have a very low void space that exhibits minimal expansion and contraction during heating and cooling which may minimize the transfer of fluids during thermal cycling. The foil layer may also provide a barrier between the object and matrix.

In some embodiments, or in combination with any of the above embodiments, there may be layers of foil between other layers to improve insulation. The foil layer may also protect the insulation from wear due to system vibration.

In some embodiments, or in combination with any of the above embodiments, the outside layer may be a foil layer to improve thermal insulation or protection properties. In these applications, the cover and foil layer will be self-molding.

In some embodiments, one or more layers of the composite system may be infused with matrix.

In some embodiments, or in combination with any of the above embodiments, the at least one structural reinforcement layer or base layer may be infused with matrix.

In some embodiments, or in combination with any of the above embodiments, the matrix may have the same composition in multiple layers.

In some embodiments, or in combination with any of the above embodiments, the matrix may have different compositions in different layers.

In some embodiments, or in combination with any of the above embodiments, the matrix may be applied as a solution, dispersion, emulsion.

In some embodiments, or in combination with any of the above embodiments, matrix will be applied as a thermoplastic solvent-based polymer solution comprised of ground thermoplastic polymer and one or more of a surfactant or additive. The ground thermoplastic polymers may include, but are not limited one or more of polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and ethylene-tetrafluoroethylene (ETFE). The solvent may be organic or inorganic. The thermoplastic solution may include one or more functional additives. Furthermore, the thermoplastic solvent based polymer solution flows within one or more layers of the material. A polymeric fiber typically comprises a polymer with a specific viscosity in order to be able to draw down and spin the polymer into a fiber. However, unlike using fiber, using a ground polymer in this system allows manipulation of the polymer melt flow index ("MFI"), allowing for a larger range of MFI than possible in a fiber. In some embodiments, a high MFI ground polymer is used for ease of flow of the molten polymer between the layers of the composite system. In yet other embodiments, a low MFI ground polymer is used for more mechanical strength.

In some embodiments, or in combination with any of the above embodiments, various emulsifiers can be added to the solvent based polymer solution to aid in forming a stable solution. Exemplary emulsifiers include anionic surfactants (e.g., sulfates, sulfonates, and sacrocides), nonionic surfactants (e.g., polyethylene glycol (Triton X-100), ethoxylated linear alcohols, ethoxylated alkyl phenols, fatty acid esters, amine and amide depravities, or the like), cationic surfactants (e.g., linear alkyl amines and alkyl ammoniums, ester amides, ether amines, oxy amines, or the like), amphoteric surfactants (e.g., propionic acids, quaternized compounds), fluorinated surfactants (e.g., perfluorinated carboxylates and sulfonates), and the like.

In some embodiments, or in combination with any of the above embodiments, a liquid polymer matrix may be applied as a thermoset polymer solution. The thermoset polymers may include one or more of alkyd, amino, epoxy, phenolic, polyester, polyimide, polyurethane, silicate, or silane. The thermoset polymer solution may include one or more organic or non-organic solvents. The thermoset polymer solution may include one or more functional additives. Furthermore, the thermoplastic solvent based polymer solution flows within one or more layers of the material.

In some embodiments, or in combination with any of the above embodiments, the matrix solution may be sprayed, brushed, coated, rolled, dipped or otherwise applied onto one or more of the layers of the composite system after installation. The matrix may comprise at least one thermoplastic, thermoset or other polymeric material. The solvent may be organic or inorganic.

In some embodiments, or in combination with any of the above embodiments, the matrix solution may be incorporated into one or more of the layers prior to installation. The matrix may comprise at least one thermoplastic, thermoset or other polymeric material. The solvent may be organic or inorganic.

In other embodiments, or in combination with any of the above embodiments, the matrix solution is applied to the completed part via dipping, brushing, spraying or similar methods. The penetration is controlled via chemical composition, surface tension, mechanical force, vibration, turbulence and/or ultrasonic waves introduced to the bath.

In some embodiments, or in combination with any of the above embodiments, the matrix will flow through 2 or more layers and create an interfacial area of the composite. The interfacial area may have fibers from one or both layers that extend into or cross the interfacial area.

In some embodiments, or in combination with any of the above embodiments, the surface of the composite may include a customizable topcoat. The customizable topcoat may be a thermoplastic or thermoset polymer based system or other suitable material. The customizable topcoat may also include one or more functional additives.

In some embodiments, one or more functional additives may be added to the matrix or topcoat. Functional additives may include but are not limited to colorants, additives to improve abrasion resistance, flame resistant additives, surface tension modifiers, fillers, strength additives, glass-transition modifiers such as bentonite clay, additives for thermal protection such as infrared reflecting ceramics, and/or additives for creating various textures or visible appearances to the composite system such as titanium dioxide. Other additives may include lubricants, UV stabilizers, antimicrobials, antioxidants, and the like. Colorants may include but are not limited to high temperature ceramic pigments, metal pigments, clay earth pigments, carbon pigments, synthetic pigments, and other pigments to impart color and/or varying levels of opacity to the polymeric system. Additives to improve abrasion protection may include, but are not limited to iron oxide, ceramics, silicates, and metals. Flame resistance additives may include but are not limited to aluminum hydroxide, antimony oxides, chlorinated compounds, antimony oxides and organ phosphorus compounds. Fillers may include but are not limited to glass beads, fumed silica, pulps, clays, silica, talc, diatomaceous earth, lime and other inert materials. Surface tension modifiers may include but are not limited to fluorocarbons, wetting agents, and silicone. Strength additives may include but are not limited to milled carbon fiber, glass, metal and aramid fibers.

In some embodiments, or in combination with any of the above embodiments, heat is applied to part after installation is complete to cure the system. The heat may facilitate and or accelerate curing of the composite system. Heat may also facilitate polymer flow within and between the layers.

In some embodiments, or in combination with any of the above embodiments, the completed part is placed in an oven to facilitate curing.

In some embodiments, or in combination with any of the above embodiments, external molding features can be molded into the system via molding plates applied prior to curing as required in the end application. External molding features may include flatted areas for clearance, holes for ports, and other features.

In some embodiments, or in combination with any of the above embodiments, external molding features can be molded into the completed part after curing.

In some embodiments, or in combination with any of the above embodiments, the composite insulation system is repairable. As such, if the system becomes worn, torn, or the like, it may be easily repairable without replacing the composite insulation. Furthermore, the self-molding composite system may act as a repair for damage to any type of insulation or covering system. In this way, a repair mixture may be provided to the installer or end-user to complete a repair. The mixture may be a thermoplastic or thermoset polymer solution. Thermoplastic systems may include one or more dry ground polymers in crystalline or semi-crystalline form dissolved or otherwise dispersed in an inorganic or organic solvent. Additives may be included in the repair mixture in order to produce a repair that is both physically and esthetically acceptable. Additives may include any of the matrix additives. In this way, the installer or end-user may be able to apply the repair mixture by brush, roller, trowel, spray, or the like such that the repair mixture fills and covers the damaged area of the system. Once the repair mixture has been applied, heat may be applied to cure the repair mixture. The heat may be applied via heat gun, oven, or the like. During curing the repair mixture may flow into the various layers of the insulator and fuse them together to patch the damage created to the insulator.

As one of ordinary skill in the art appreciates, any combination of the one or more layers of the composite system may be utilized based on application requirements, such as thermal qualities, breathability, abrasion qualities, appearance, or the like desired based on the insulation and/or covering operations being performed.

Embodiments of the invention relate to apparatuses and methods for providing a composite system comprising: optional structural reinforcement layers or base layers of fiber reinforcement that may or may not contain resin based fibers; polymer based matrix that can be pre-applied to the material, applied during installation or after installation; a cover that may or may not contain resin fibers that provides consolidation without external force being applied.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
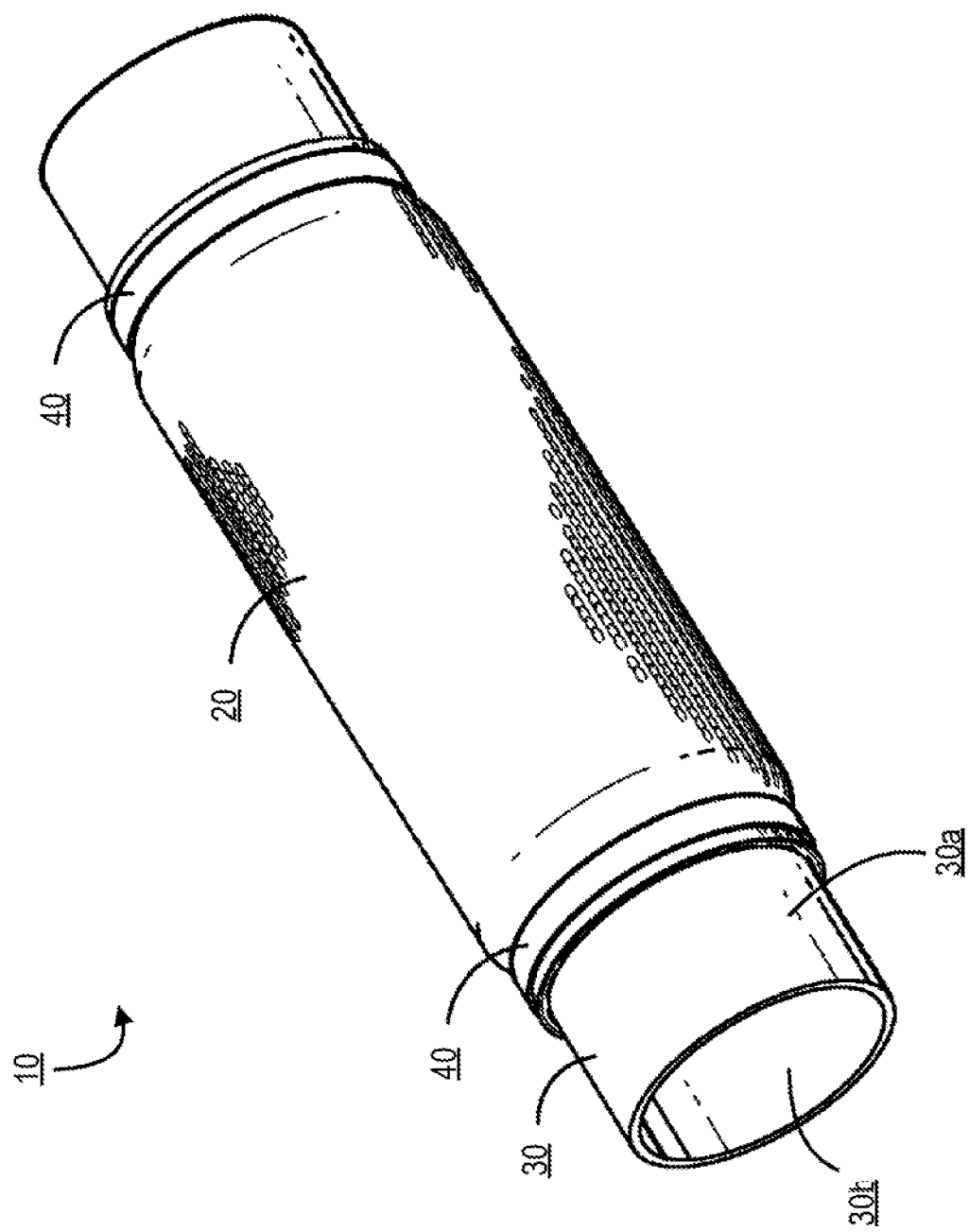
Figure 2:
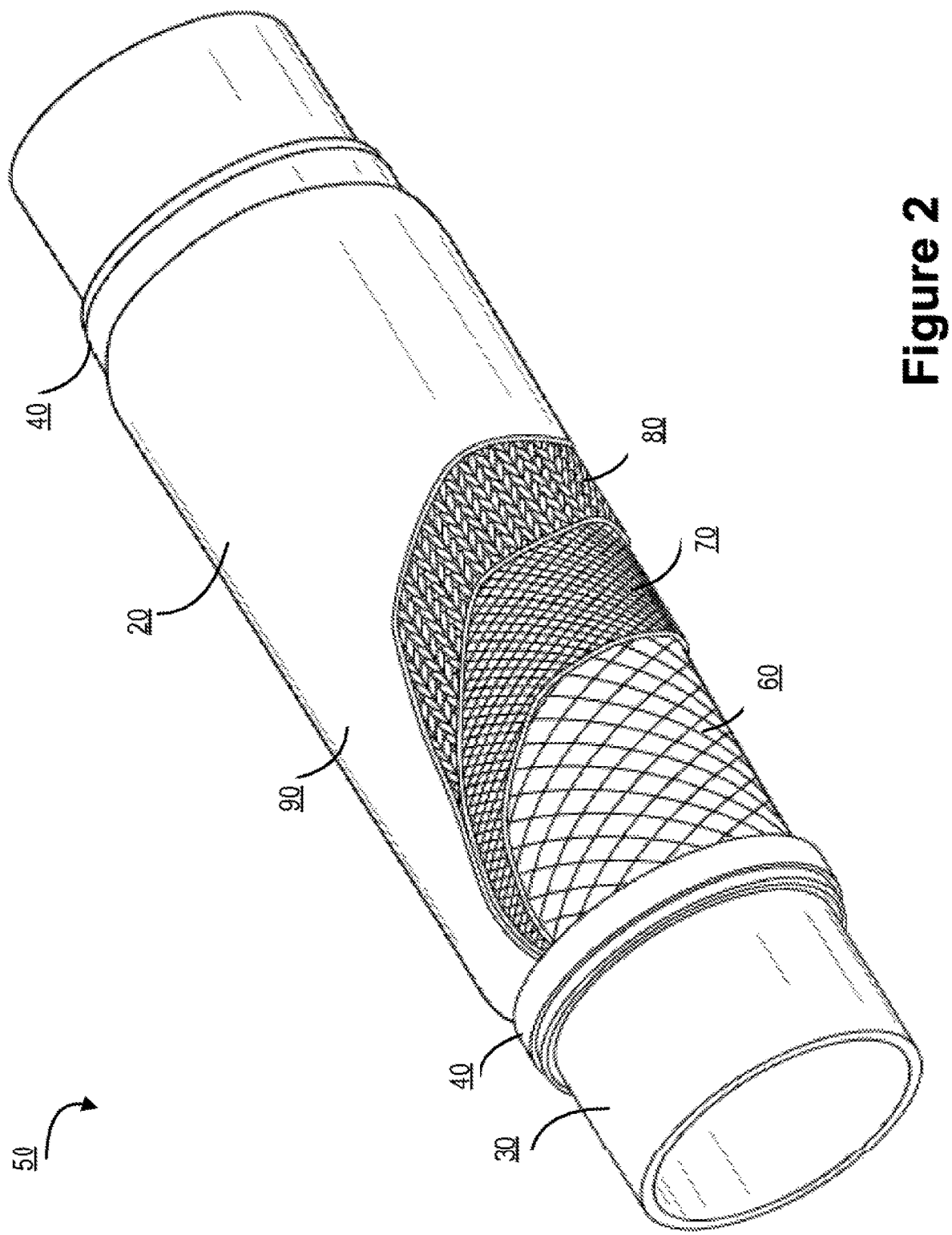
Figure 3:
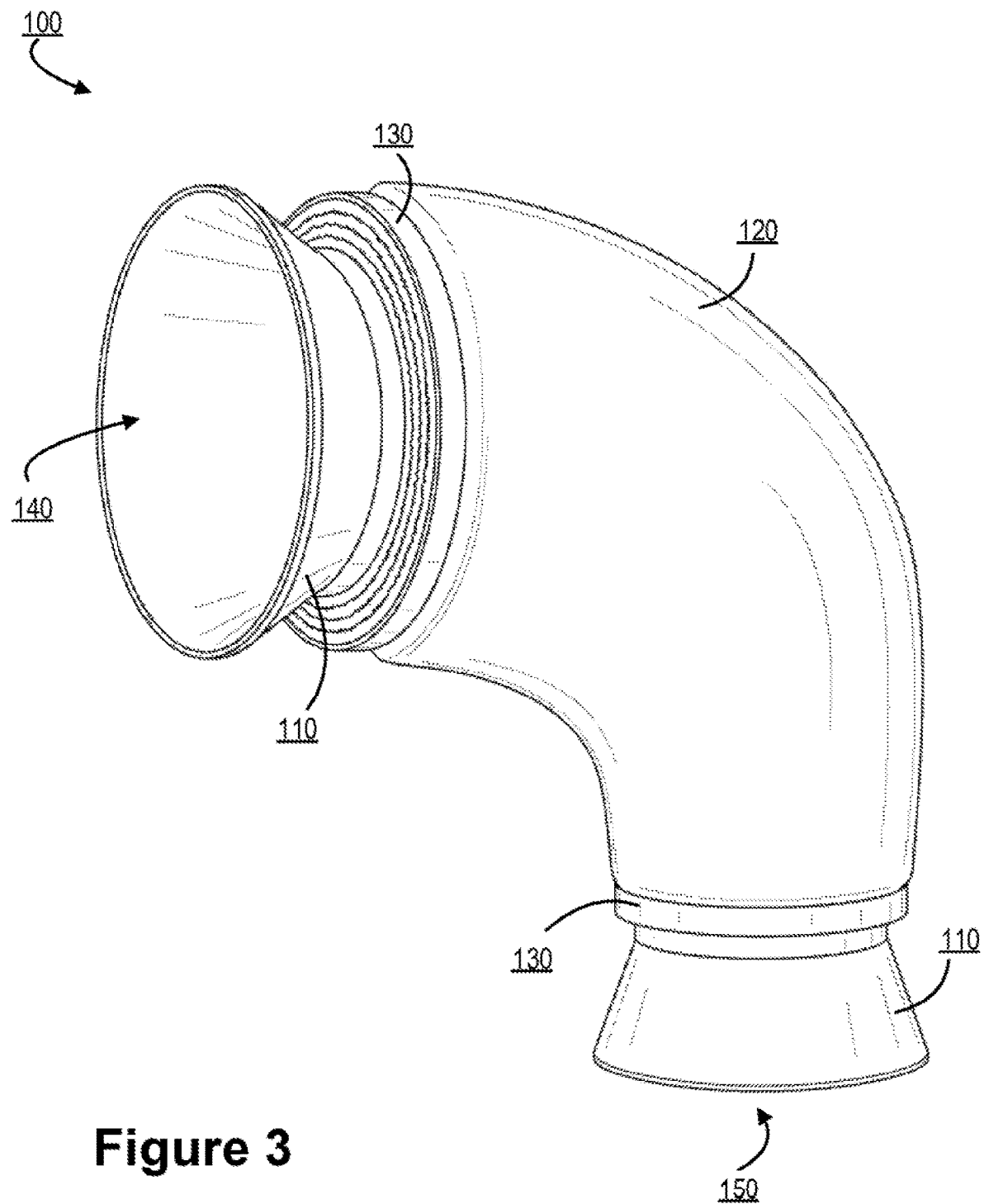
Figure 4:
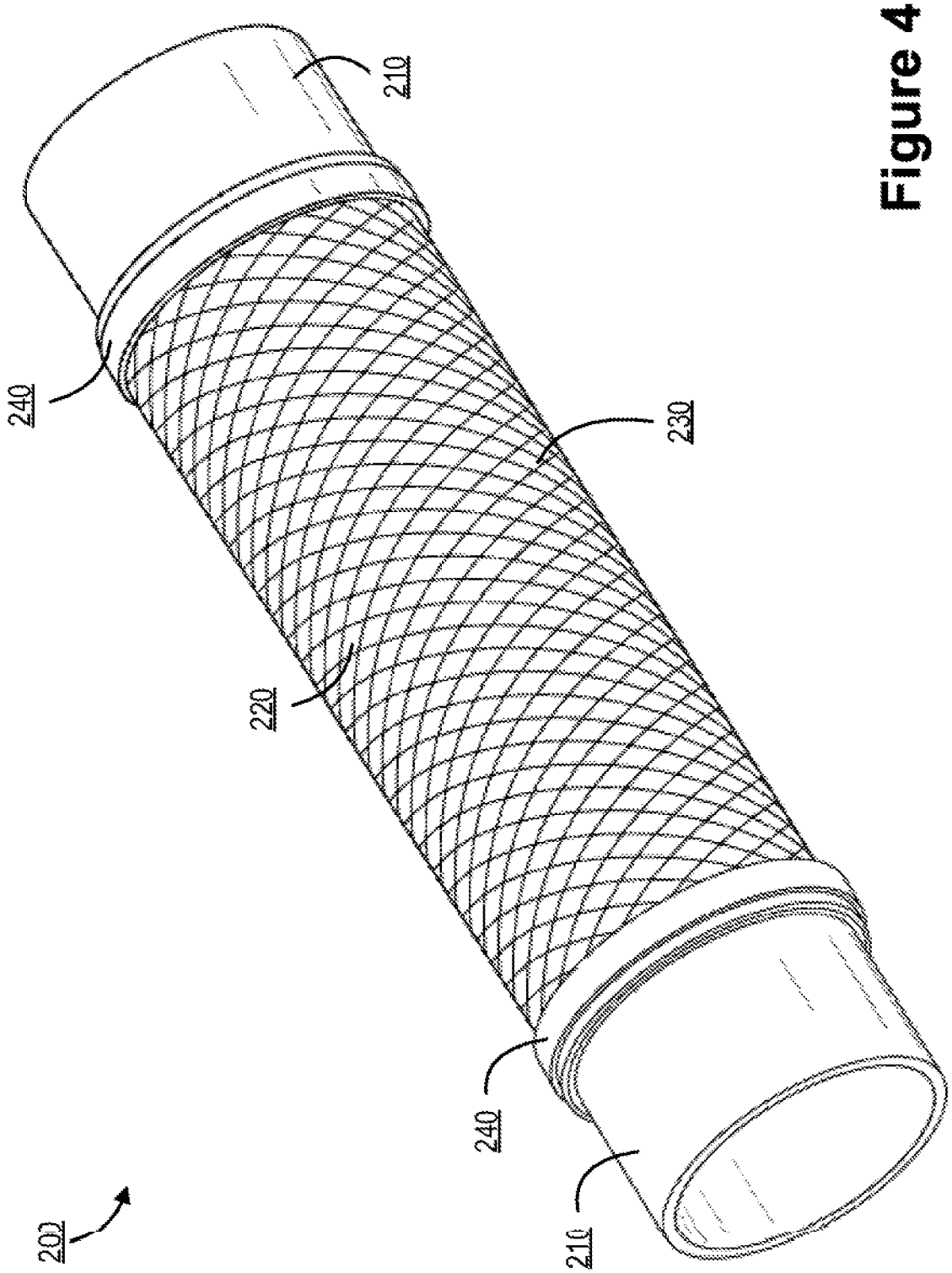
Figure 5:
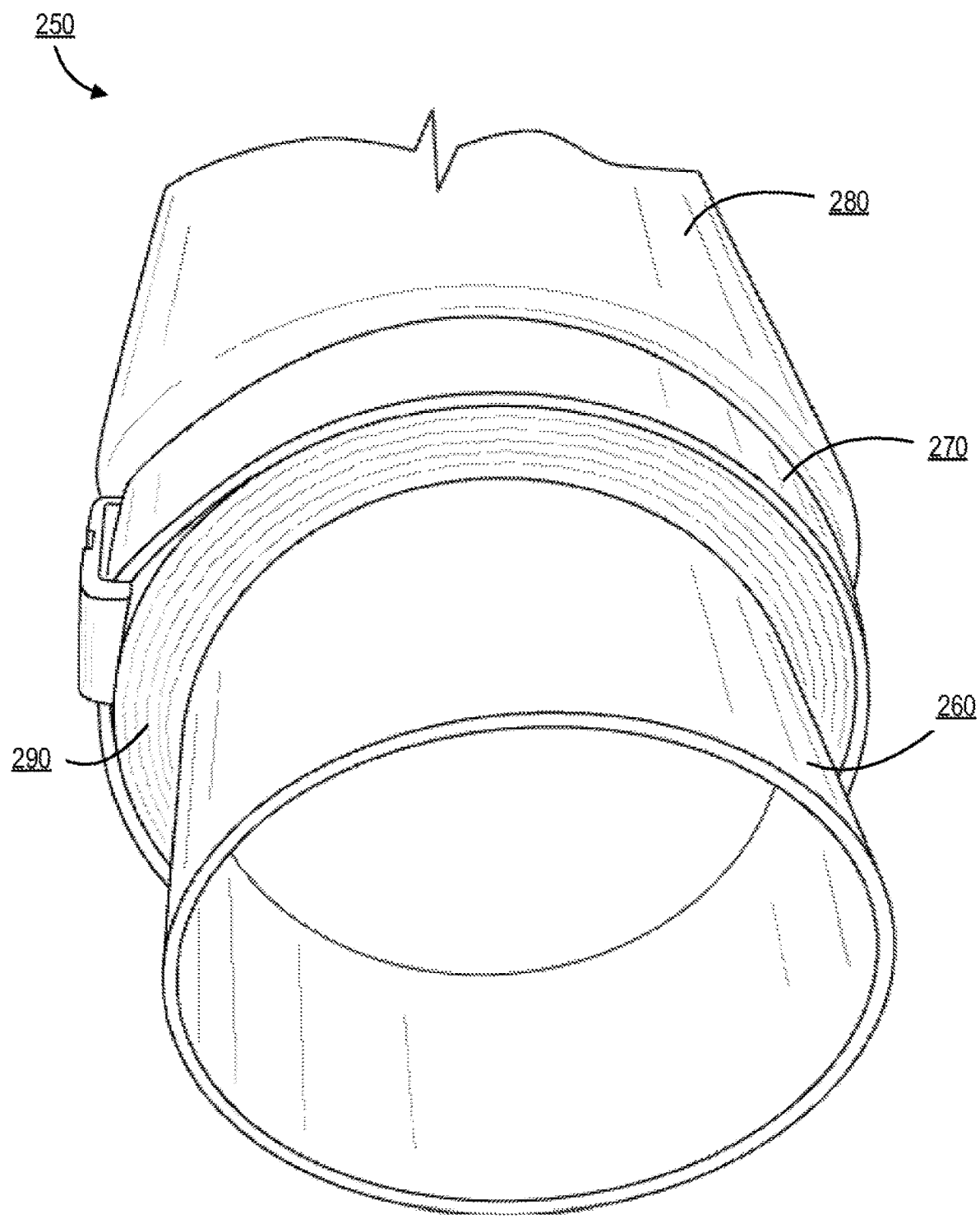
Figure 6A:
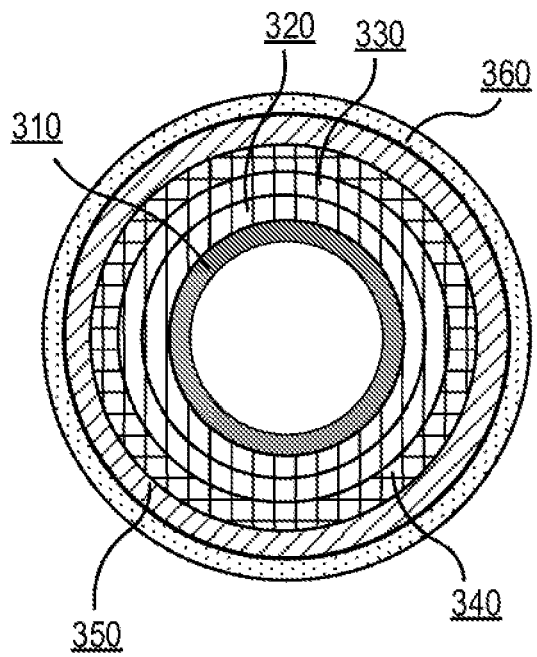
Figure 6B:
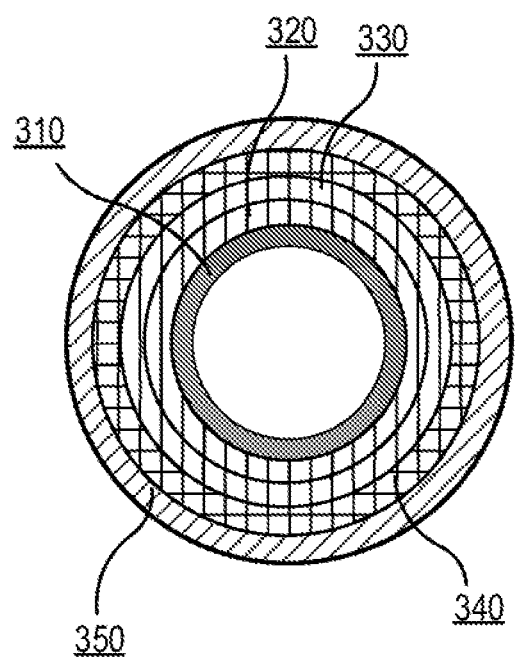
Figure 6C:
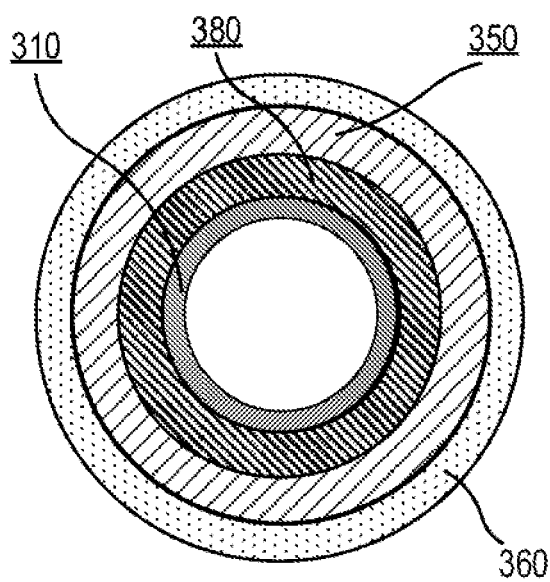
Figure 6D:
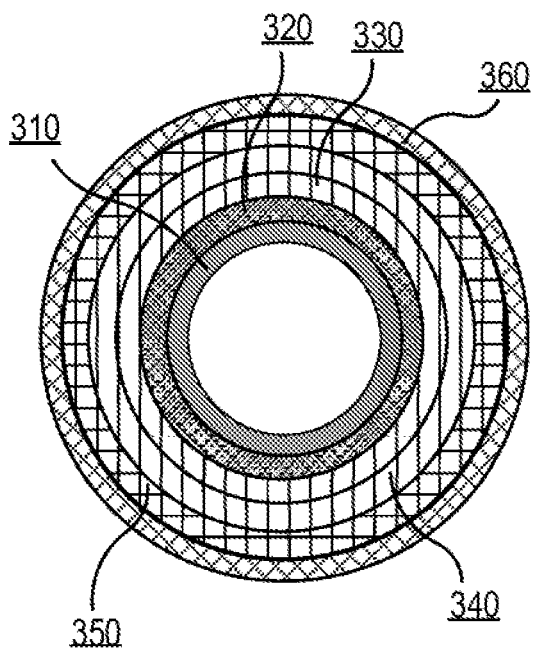
Figure 9B:
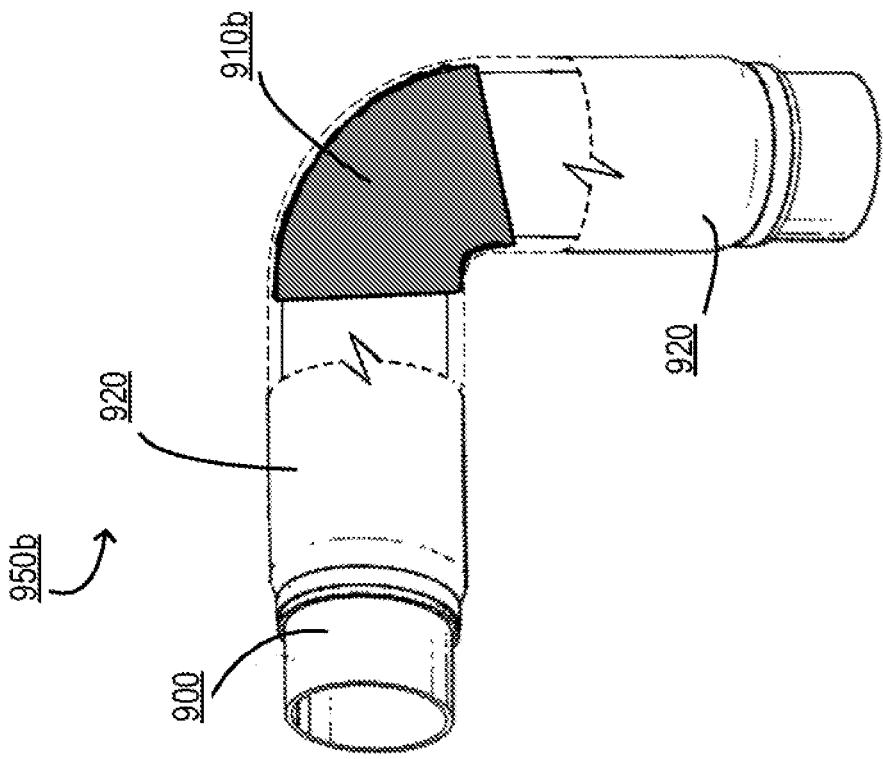
Figure 9A:
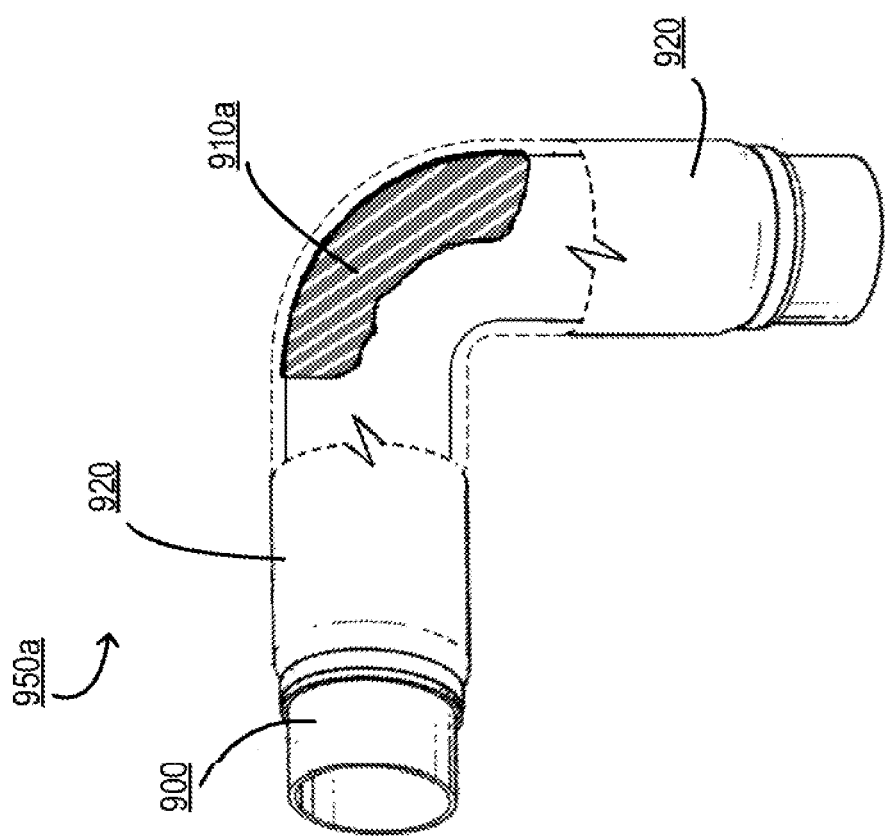

Having thus described embodiments of the invention in general terms, reference will now be made the accompanying drawings, wherein:

FIG. 1 illustrates a perspective view of a composite insulation system, in accordance with various embodiments of the invention;

FIG. 2 illustrates a perspective cut-away view of a composite insulation system with an interfacial layer and topcoat, in accordance with various embodiments of the invention;

FIG. 3 illustrates a perspective view of a composite insulation system around a reduction pipe, in accordance with various embodiments of the invention;

FIG. 4 illustrates a perspective view of a composite insulation system with a braided cover, in accordance with various embodiments of the invention;

FIG. 5 illustrates an end view of a composite insulation system with a clamp, in accordance with various embodiments of the invention;

FIG. 6a illustrates a cross-sectional view of a composite system, in accordance with various embodiments of the invention;

FIG. 6b illustrates a cross-sectional view of a composite system, in accordance with various embodiments of the invention;

FIG. 6c illustrates a cross-sectional view of a composite insulation system, in accordance with various embodiments of the invention;

FIG. 6d illustrates a cross-sectional view of a composite insulation system, in accordance with various embodiments of the invention;

FIG. 7 illustrates a cross-sectional view of the curing process of a composite system, in accordance with various embodiments of the invention; and FIG. 8a illustrates a perspective view of a self-molding, fiber reinforced composite system, in accordance with various embodiments of the invention;

FIG. 8b illustrates a cross-sectional view of the self-molding, fiber reinforced composite system of FIG. 8a;

FIG. 9a illustrates a cut-away view of a composite insulation system, in accordance with various embodiments of the invention; and FIG. 9b illustrates a cut-away view of a composite insulation system, in accordance with various embodiments of the invention;

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

The embodiments presented herein are directed to composite insulation systems structured for use as insulation, structural supports, covering and/or protection means for one or more components. "Components" as used herein may refer to machine components, structural members, mechanical systems/components that require insulation, structural support/reinforcement, covering, or that need to be otherwise protected. In some embodiments, the component is a hollow tubular member, a pipe, a duct, a hose, a cylindrical/tubular section, a hollow member with a suitable cross-section and a straight/curvilinear axis, a fitting member used in piping assemblies, valves utilized in piping assemblies or the like. In some embodiments, the component is configured to transport, carry, convey, direct, control and/or regulate flow of fluids (liquids, gases), fluidized solids, slurries and the like. In some embodiments, the component may refer to transfer pipes and ducts, heating and cooling lines, fluid supply lines and steam lines configured for use in industrial applications and suitable heating/cooling systems. In some embodiments, the component is configured to be utilized in exhaust systems, engine cooling tubes, air intake systems and other automotive applications. For example, the component may be an exhaust component comprising a hollow tubular member or a pipe configured to carry exhaust gases (or other fluids) from one location to another. As another example, the component may be a pipe or a pipe assembly/fitting component configured to transport fluid in an industrial application or in a building.

In some embodiments, the composite insulation system, as used herein, may refer to a composite insulation or a cover that is structured to be provided on one or more components, or at least a portion of an outer surface of one or more components. In some embodiments, the composite insulation system, as used herein, may refer to an insulated component comprising the composite insulation or the cover provided on at least a portion of the component to be insulated. In this regard, the composite insulation system may refer to the insulated component either, before, during, or after assembly and/or prior to, during or after treatment/processing/curing of the composite insulated provided on the component. Insulation, as used herein, may refer to thermal insulation of the component, structural support/reinforcement of the component, covering of one or more surfaces of the component for protecting the component from ambient environment/operating conditions, coverings for energy consumption optimization, acoustic insulation and/or electrical insulation. Typically, the composite insulation system finds applications in thermal insulation for regulating thermal conduction, thermal radiation or heat transfer in general between the component and the fluid transported or conveyed by the component. However, the composite insulation system may also regulate heat transfer between the component and the surroundings.

The composite insulation system as described herein may be used in a variety of applications and on a variety of components, including exhaust insulation covers, pipe insulation covers, machinery or engine covers (such as turbine covers), rigid fire barrier panels, gun barrel covers, heat curable composite textile fabrics, patches associated with the above, and/or the like. The composite insulation systems may be configured to insulate automotive, industrial, residential, recreational vehicle piping and ducting. Automotive applications of the composite insulation system include exhaust systems, engine cooling tubes and air intake systems. Here, insulation may be used on exhaust systems in order to maintain high temperature of exhaust gases for efficient combustion, to maintain heat for the efficient operation of internal emission systems, to protect surrounding/proximate components and/or to protect people that may come in contact with pipes. Industrial applications of the present invention may include insulation of exhaust gases and hot and cold fluids.

Specifically, the composite insulation system of the present invention is structured to withstand and maintain structural integrity when used with components/applications operating at high temperatures and/or operating with large temperature fluctuations, like exhaust systems and other applications involving hot fluids. The composite insulation system may also be structured to withstand extreme environmental conditions and may also be structured to protect the component from or minimize rust and corrosion, deformation, wear and fatigue, surface deterioration, fracture and/or other damage. Furthermore, the composite insulation system may be structured to protect surrounding devices/members from high temperatures of the component itself and from high temperature fluids emitted from the component.

In some embodiments, the composite insulation system, and particularly the composite insulation or cover is mass-customizable, flexible and adaptable, and can be configured for insulation of a variety of components of different shapes, contours, sizes/dimensions, operating conditions and insulation requirements. Typically, this customization may be achieved prior to, during and/or after assembly of the composite insulation and the component. In addition, in some embodiments, the composite insulation system is self-molding, fiber reinforced composite insulation. Typically, the composite insulation comprises at least one structural reinforcement layer (also referred to as one or more structural reinforcement layers, on some instances). In some embodiments, the composite insulation further includes a matrix layer to impart stiffness and strength, and/or to achieve adhesion, union or linkage of the one or more structural reinforcement layers. Furthermore, in some embodiments, the composite insulation includes an outer cover layer or an outer structural reinforcement layer structured to impart compressive strength such that an external mold is not necessary to consolidate the composite insulation structure on the component. In such embodiments, the layers of the composite insulation and the composite matrix may become a cohesive composite when the composite insulation system is treated or cured.

In one such embodiment, the composite insulation system of the present invention is a customizable, self-molding, fiber-reinforced composite insulation system that can be simply applied to an individual component or efficiently run on high-volume part configurations. In this regard, the composite insulation system may comprise a highly flexible, self-molding cover, at least one structural reinforcement layers, one or more highly customizable matrix layers or a liquid polymer matric solution, a topcoat and/or a clamping mechanism that is provided on the component (for instance, a pipe or duct) and treated/cured on the component without requiring external molds. In this innovative system, two or more layers of the composite insulation may be fused together via an interfacial matrix layer to provide a rigid layer/cover around the component.

The composite insulation system and its embodiments will now be described in detail with respect to FIGS. 1-8. FIG. 1 illustrates a perspective view of a composite insulation system 10, in accordance with various embodiments of the invention. In the embodiment illustrated in FIG. 1, the composite insulation is applied to an outside of a component 30. The component 30 may be a pipe 30 such as an exhaust pipe, in some embodiments. Here the pipe 30 may acts as an internal mold. Although illustrated as a pipe with a circular cross-section, the component 30 may comprise any suitable polygonal or curvilinear cross-section. As such, the component 30 or the pipe may be a hollow tubular member of a suitable length extending along a straight or curved axis. Furthermore, the cross-section of the component 30, defined perpendicularly to the axis of the component, may be constant throughout its length, or the dimensions and/or shape of the cross-section may be variable along the length of the component 30. Typically, the component 30, such as the pipe 30 may comprise an outer surface 30a and an inner surface 30b separated by a thickness T. The outer surface 30a may be positioned outward, towards the surrounding of the component 30. While the opposing inner surface 30b may form a conduit for a fluid. Although referred to as a component 30, it is understood that the component 30 may refer to one or more components 30 such as one or more pipes, pile fillings and the like.

The composite insulation system 10 further comprises the composite insulation 20 positioned proximate the outer surface 30a of the component 30. However, based on the desired application, the composite insulation 20 may be positioned on at least a portion of the outer surface 30a, at least a portion of the inner surface 30b and/or at least a portion of the lateral sides that terminate the outer and inner surfaces of the component 30. In some embodiments, the composite insulation 20 may be placed on at least a portion of one or more components 30.

Finally, as illustrated by FIG. 1, the composite insulation system 10 may further comprise fastening members such as clamps 40 or other securing means that may be configured to securely hold the composite system over a section/portion of the component 30. The clamps 40 may be screw or ratchet tightening clamps, band clamps, clips, ropes or other fastening means. In yet other embodiments, the clamps 40 may be wire twisted or tightened around the component 30, with the composite insulation 20 in between them. Any number of clamps 40 may be employed based on requirements. The clamps 40 may be positioned, for example on an outer layer of the composite insulation 20 positioned on the component 30, either before, during or after treatment/curing of the composite insulation 20.

In some embodiments, an outer visible layer of the composite insulation 20 may include a self-molding fiber cover, such as a knit cover or a braided cover, and an optional customizable topcoat cured thereon. The self-molding fiber cover structured to encase the at least one structural reinforcement layer and provide compression around the at least one structural reinforcement layer and at least partially around the component without application of external forces. Typically, the self-molding fiber cover is elastic, spring-like and biased towards its original configuration, to provide compression around the at least one structural reinforcement layer and at least partially around the component without application of external forces. Specifically, the self-molding fiber cover can be expanded from its original configuration to fit or encase the dimensions of the component and any structural reinforcement layers on the component, but will be biased towards its original configuration, which therefore provides a compressive force around the encased at least one structural layer and the component. The self-molding fiber cover, such as the knit cover or a braided cover, can be formed by circular or wrap-knitting. The self-molding fiber cover can be knit to the required size or knit to a larger size and cut and sewn to the required dimensions. In some embodiments, the outer visible layer of the composite insulation 20 includes self-molding fiber cover comprising a braided cover and an optional customizable topcoat cured thereon. The braided cover can be braided to the needed size or braided to a larger size and be cut and sewn to the required dimensions. In some embodiments, the outer visible layer may be a woven material. In some embodiments, the outer visible layer may be a nonwoven.

In some embodiments, the outer visible layer of the composite insulation 20 may comprise a customizable top coat that includes one or more additives for additional abrasion protection such as fiber pulp, fumed silica, iron oxide, additives for thermal protection such as perlite and vermiculite, non-stick additives for dust build up prevention such as polytetrafluoroethylene (PTFE), additives for creating various textures such as glass spheres, additives for visible appearance, such as high temperature ceramic color pigments, and/or additives for additional strength such as metals, milled fibers, or carbon fiber.

Although the embodiment illustrated in FIG. 1 shows, the composite insulation 20 (which may include a customizable top coat and a knit cover), it will be appreciated that the composite system can include any configuration and be used in a variety of different applications.

FIG. 2 illustrates a perspective cut-away view of a composite insulation system 50, in accordance with some embodiments of the invention. This depiction details one of numerous embodiments of the invention, although the component 30, the clamps 40 and the composite insulation 20 of the composite insulation system 50, may by substantially similar to those described with respect to composite insulation system 10, illustrated in FIG. 1. FIG. 2 further includes a cut-away view of the composite insulation 20. As discussed previously, the composite insulation may comprise at least one structural reinforcement layer, one or more interfacial matrix layers (e.g., formed by applying a liquid polymer matrix solution to the at least one structural reinforcement layer and the self-molding fiber cover positioned at least partially on the component and cured thereon), a cover and/or a topcoat. FIG. 2 illustrates the composite insulation 20 with a base layer 60 or a base structural reinforcement layer 60, a knit cover 80 or a second structural reinforcement layer, an interfacial matrix region 70 between the base layer 60 and the knit cover 80, and a top coat 90 provided over the knit cover 80. The base layer 60 may be a single braided base layer 60, or a knit layer 60. Although referred to a knit cover 80, it is understood that the cover 80 may comprise a braided cover.

In some embodiments, the base layer 60 may be made from high-temperature resistant materials for insulation purposes, including, but not limited to e-glass, s-glass, basalt, silica, oxidized polyacrylonitrile, carbon fiber, mineral, and/or ceramic materials. Each of these temperature resistant materials may be used depending on the application requirements of the composite insulation system. Specifically, each material may be rated for use at a higher and/or lower continuous operating temperature depending on the application.

In some embodiments, braided constructions (such as single braided layers or multiple braided layers) may be used in the base layer 60 because they can typically deliver thicker profiles than knitted materials or woven materials. Furthermore, the braided construction allows for easy workability around components 30 such as pipe bends or the like. For example, stretching the braided layer along the length of the exhaust pipe 30 upon installation tends to tighten the braided layer down around the pipe 30 or any underlying layer along the straight and bent sections.

In some embodiments, the base layer 60 or the structural reinforcement layer 60 is infused with the same interfacial matrix solution as the cover 80, and an interfacial matrix region 70 is formed between them during and/or after treatment/curing. The liquid polymer matrix solution is structured to be applied to the at least one structural reinforcement layer and the self-molding fiber cover positioned at least partially on the component and to be cured to thereby form the fiber-reinforced composite insulation system having the interfacial matrix region 70. The interfacial matrix region 70 may form a continuous matrix between the matrix infused layers 60 and 80. After application of the interfacial matrix solution, the matrix infused base layer 60 and the matrix infused knit cover are also referred to as fibrous layers. This interfacial matrix region 70 between layers 60 and 80 creates a multi-layer composite insulation 20 that contains 2 structural reinforcement layers (60, 80) comprising infused fibrous layers with a continuous matrix throughout and an interfacial matrix region between the 2 fibrous layers (60, 80). As such, the interfacial matrix regions 70 may be formed at any interface of the reinforcement layer/fibrous layer and the interfacial matrix, for example, between the outer surface 30a of the component 30 and the base layer/fibrous layer 60, between the base layer 60 and the knit cover/fibrous layer 80, on the outer surface of the fibrous layer 80, and the like. The interfacial matrix region 70 between the infused base layer 60 and the knit cover 80 illustrated in FIG. 2, serves the function of joining fibrous layers 60 and 80.

In some embodiments, the base layer 60 may be infused with a different matrix than the cover 80. Different matrix systems may be used depending on the end-use. In high-temperature applications, the base layer 60 may be infused with a high-temperature tolerant matrix as it is closest to the pipe or duct. In cold temperature applications, the base layer 60 may be infused with low-temperature flexible matrix.

Depending on the composition of the different matrix systems, the interfacial layer 70, may or may not be present.

In some embodiments, the interfacial matrix solution is sprayed, brushed, coated, rolled, dipped or otherwise applied onto the base layer 60 and/or the knit cover 80. In yet other embodiments, the matrix solution is integrated into the base layer 60 and/or the knit cover 80 prior to installation of the base layer 60 and the knit cover 80. In yet other embodiments, interfacial matrix layer 70 is achieved through diffusion of an external application of a matrix solution from layer 90 via brushing, spraying or dipping.

In some embodiments, the liquid interfacial matrix solution used in the composite insulation 50 may be thermoplastic and in others thermoset polymer solution. In some embodiments it may contain both thermoplastic and thermoset solutions. It may also include a number of functional additives.

In some embodiments, the self-molding fiber cover, such as a knit cover 80 is comprised of a knit fabric that slips over and encases the base layer 60, and is structured to provide compression and is configured to maintain its structural integrity during curing/treatment and during operation of the component. In addition, as further illustrated in FIG. 2, the composite insulation system may further comprise a customizable top coat 90. In some embodiments, the customizable top coat 90 may be a polymeric based system. The polymeric based top coat may be a thermoplastic or thermoset based system.

When treated/cured, a portion of the customizable top coat 90 may flow into the underlying layers of the composite system in some instances, thus providing layers that are mechanically and chemically bonded across each other, and creating a rigid layered composite. In some embodiments, at least a portion of the customizable top coat 90 may still be visible on the knit cover 80 after curing. As such, customizable appearances or outside layers with additional abrasion protection, strength, non-stick features, and other textures may be achieved based on the desired application. In some embodiments, clamps 40, such as stainless steel band clamps may be provided to affix the composite system to the pipe 10 before, during or after treatment/curing, although other attachment means such as wire twist bands or the like may be used. In some embodiments, clamps are not necessary.

FIG. 3 illustrates a perspective view of a composite insulation system 100 around a reduction pipe 110 or component 110, in accordance with various embodiments of the invention. As illustrated, a 90 degree bent reduction pipe 110 is provided. The bent reduction pipe 110 includes a composite insulation 120 attached thereto. As illustrated, the layers of the self-molding composite insulation 120 may be slid onto the bent reduction pipe 110 and tightened such that there is no build-up of material at the interior of the bend and no build-up of material at the reduction site. In the embodiment illustrated in FIG. 3, for example, the larger opening 140 in the pipe 110 may be a 6 inch diameter opening. Continuing with the example, the smaller opening 150 of the pipe 110 may be a 4 inch diameter opening. Even with this reduction and the 90 degree bend, the composite system is configured to be positioned on the pipe and pulled tight without a build-up of materials and/or without requiring special molding equipment to produce a clean and even insulation.

FIG. 4 illustrates a perspective view a composite insulation system 200, in accordance with various embodiments of the invention. In the embodiment illustrated in FIG. 4, the composite insulation 220 is installed on a pipe 210 with a braided cover 230 and two clamps 240. The braided cover 230 may be infused with either a thermoplastic or thermoset matrix solution.

FIG. 5 illustrates an end view of a composite insulation system 250, in accordance with various embodiments of the invention. The end of an exhaust pipe 260 (for example, a 4 inch exhaust pipe) is illustrated with a self-molding composite insulation 280 applied to the section of pipe. As illustrated, the self-molding composite system 280 has a clamp 270 on one end of the composite insulation 280. As noted above, the composite insulation system 280 may comprise one or more layers. In a typically layered device, the layers would be evident from the end of the system. However, as illustrated in FIG. 5, the matrix solution and one or more additives may be present via processing or added to the ends of the system to create a clean end section 290 of the composite insulation system 280. In this way, the polymeric matrix solution, once cured is visible on the end section 290 and, as such, encapsulates the end section 290 to protect and conceal the layers of the composite system.

FIGS. 6a-6d illustrate cross-sectional views of fiber based structural reinforcement layers and interstitial matrix distribution through the cross-section of various embodiments. Through various matrix application techniques, the penetration of matrix solution can be achieved and the matrix solution may be infused into the at least one structural reinforcement layer. This series of figures attempts to illustrate a small selection of the numerous configurations that can be easily achieved with this customizable, self-molding, fiber-reinforced composite insulation system.

FIG. 6a, illustrates a cross-section of the one embodiment of the invention. In this embodiment, the fibrous layers are 320, 330 and 350 on pipe 310. A braided layer 320 is positioned on the outer surface of the pipe 310 or component. A second braided layer 330 is positioned over the first braided layer 320. An interfacial matrix layer 340 is found between the second braided layer 330 and the knit cover 350. A topcoat 360 may be provided over the knit cover 350 as the outermost layer. In this instance, the interstitial matrix is typically continuous from the topcoat 360 through the second braided layer 330 and/or the first braided layer 320. This embodiment produces a strong, multi-layer composite insulation system with excellent durability. Although illustrated with three fibrous layers and one interstitial matrix regions, it is understood that more or fewer fibrous layers (either same or different fibrous layers) with one or more interstitial matrix regions (with either same or different matrix solutions) may be employed. For example, one embodiment of the composite insulation may comprise at least one structural reinforcement/fibrous layer, at least one interstitial matrix region, and/or at least one topcoat.

In one instance of the embodiment illustrated in FIG. 6a, the first braided layer 320 and the second braided layer 330 may be e-glass braided layers, while the knit cover 350 may be substituted with a braided cover 350. Furthermore, the interstitial matrix substrate 340 may be a thermoplastic substrate and similarly the topcoat 360 may also be a thermoplastic topcoat. Therefore, the composite insulation system in this instance includes 2 layers of e-glass braid, a braided cover, thermoplastic matrix and a thermoplastic topcoat. For assembly or installation, the two layers of e-glass braid (320, 330) may positioned on the pipe 310 and trimmed sequentially. The braided cover 350 may then be slid over or positioned over the braided layers (320, 330) and pulled tight. The braided cover 350 is typically structured to provide compression over the entire system and produce a smooth surface without any bumps or wrinkles. Clamps may then be installed on each end of the composite insulation and any material outside the clamps may be trimmed. The open ends of the pipe 310 may then be capped and the entire assembly or composite insulation system may then be submerged into a thermoplastic matrix solution optimized for dipping. The composite insulation system may be submerged for a period of time to ensure that the matrix solution penetrates at least the braided cover 350, at least the layer 330 and or the layer 320 of e-glass braid. The cured insulation system may then be removed and cleaned. A thermoplastic topcoat 360 may also be brushed onto the cover material 350 to impart a highly repellent finish to the surface. The assembly may further be cleaned before placing it in an oven for further curing at a desired temperature for a predetermined time period. Once cured, the assembly may be removed and allowed to cool before mounting the cured composite insulated system/assembly on a machine/system for operation. In this embodiment, the composite insulation system is structured to cure tightly and rigidly around the pipe without wrinkles. The matrix may flow within and between the topcoat and $2^{nd}$ layer of braided e-glass 330 to form a 2-layer, fiber reinforced composite with a interstitial region 340. The $2^{nd}$ layer of braided material 330 typically exhibits a continuous matrix from the topcoat 360 through the $2^{nd}$ layer 330.

In yet another instance, the composite insulation system may be substantially similar to that described above, but may include 4 layers of e-glass braid, a knit cover and thermoplastic matrix. For assembly, the three layers of e-glass braid may be installed and trimmed sequentially. The knit cover material may then be slid over the braided layers and pulled tight. Similarly, the clamps may then be installed on each end of the composite insulation and the material may be trimmed on the outside of the clamps. The open ends of the pipe may then be capped and the entire assembly may be submerged into a thermoplastic matrix solution optimized for dipping for certain predetermined time period to ensure that the matrix solution penetrates the $3^{rd}$, outermost layer of e-glass braid. The assembly may then be placed in the oven and cured. Once cured, the part may be removed and allowed to cool. Here, typically, the matrix flows within and between the cover and $3^{rd}$ layer of braided e-glass to form a 2-layer, fiber reinforced composite.

FIG. 6b, illustrates a cross-section of the composite insulation system in accordance with another embodiment of this invention. In this embodiment, the fibrous layers are 320, 330 and 350 on pipe 310. A braided layer 320 is positioned on the outer surface of the pipe 310 or component. A second braided layer 330 is positioned over the first braided layer 320. An interfacial matrix layer 340 is found between the second braided layer 330 and the knit cover 350. In this embodiment there may be no topcoat. This embodiment typically produces a good quality multi-layer composite insulation system at a lower cost, specifically in comparison with the preceding embodiment.

In one instance of the embodiment illustrated in FIG. 6b, the first braided layer 320 and the second braided layer 330 may be e-glass braided layers. Furthermore, the interstitial matrix substrate 340 may be a thermoplastic substrate. Therefore, the composite insulation system in this instance includes 2 layers of e-glass braid (320, 330), a knit cover 350 and an interstitial thermoplastic matrix 340. For installation/assembly, the first layer of e-glass braid 320 may be installed on the pipe 310 and trimmed. The second layer of e-glass braid 330 may then be installed over the first layer 320 and trimmed. A thermoplastic matrix solution may be sprayed onto the surface of the e-glass braid 330. The knit cover material 350 may then be slid over the braided layers (320, 330) and pulled tight. Clamps may then be installed on each end of the composite insulation and the material may be trimmed on the outside of the clamps. Thermoplastic matrix may then be sprayed onto the surface of the cover 350. The pipe and clamps may be cleaned before the assembly is cured in the oven. The assembly may be removed and allowed to cool. In this embodiment, the composite insulation system is structured to cure tightly around the pipe without wrinkles. The thermoplastic matrix may flow within and between the cover 350 and $2^{nd}$ layer of braided e-glass 330 to form a 2-layer, fiber reinforced composite with an interstitial matrix layer 340. The $2^{nd}$ layer of braided material 330 typically exhibits a continuous matrix from the cover 350 through the $2^{nd}$ layer 330.

FIG. 6c, illustrates a cross-section of the composite insulation system in accordance with another embodiment of this invention. This embodiment may comprise at least two fibrous layers 380 and 350. In this embodiment, the pipe 310 is covered with a single layer of non-woven insulation 380. Directly outside the non-woven insulation 380 is the cover 350. The cover 350 may be knitted, braided, non-woven or a combination of these. The cover 350 may further comprise the interstitial matrix solution or interstitial matrix substrate that acts to bind the non-woven insulation layer 380 and the cover 350 when cured/treated. Furthermore, a topcoat 360 may be provided over the cover 350. This embodiment typically produces an excellent insulation for the pipe 310, specifically by providing the aforementioned layers of a predetermined thickness.

In one instance of the embodiment illustrated in FIG. 6c, the first braided layer 380 may be an e-glass braided layer, while the cover 350 may be a braided cover 350. Therefore, the composite insulation system in this instance includes one layer of e-glass braid 380, a braided cover 350 and a thermoset polymer matrix. During installation/assembly, the e-glass braid may be installed on the pipe 310 and trimmed. The braided cover 350 may then be installed over the layer 380. The braided cover 350 naturally compresses and forms insulation tightly around the pipe 310. The clamps may then be installed on each end of the composite insulation and the material may be trimmed outside of the clamps. Thermoset matrix may then be brushed onto the cover before placing the assembly in the oven. Here, the composite insulation system may cure tightly over the pipe 310 without wrinkles. The thermoset matrix is typically uniformly distributed throughout the braided cover 350, but may not penetrate the braided layer 380, in some instances. Typically, a uniform distribution of thermoset matrix throughout at least the braided cover 350 cross-section is achieved after curing in the oven.

FIG. 6d, illustrates a cross-section of the composite insulation system in accordance with another embodiment of this invention. In this embodiment, the pipe 310 may be covered with a metal foil layer 320. This embodiment may comprise three fibrous layers 330, 340 and 360. A first braided layer 330 may be positioned on the metal foil layer 320. A second braided layer 340 is positioned over the first braided layer 330. An interfacial matrix layer 350 may be found between the second braided layer 340 and the knit cover 360. A topcoat (not illustrated) may also be provided over the knit cover 360 based on the requirements of the application. In this instance, the interstitial matrix is typically continuous from the knit cover 360 through the second braided layer 340 and/or the first braided layer 330. This embodiment renders an excellent insulation system with a highly protective layer next to the pipe 310.

In one instance of the embodiment illustrated in FIG. 6d the first braided layer 330 may be a precut non-woven e-glass insulation layer, while the knit cover 360 may be substituted with a braided e-glass cover 360. Furthermore, the interstitial matrix substrate 350 may be a thermoplastic matrix solution. Therefore, the composite insulation system in this instance includes a layer of aluminum foil 320, a precut non-woven e-glass insulation layer 330, a braided e-glass cover 360 and a thermoplastic matrix solution, while the second braided layer may be absent. During installation, the aluminum foil layer may be installed tightly around the pipe 310 by wrapping the foil around the pipe 310 and folding any edges. The foil may be uncoated or coated on one or both faces to promote adhesion and/or protect the foil from environmental exposure. The first layer of e-glass braid 330 may then be installed over the foil 320 and trimmed. The second layer of e-glass braid 340 may optionally be installed over the first layer 330 and trimmed. The braided cover 360 is then typically installed over the insulation layers. The braided cover 360, typically, naturally compresses and forms the insulation tightly around the pipe 310. The clamps may then be installed and any material ends may be trimmed. The ends of the pipe 310 may be capped and the entire assembly may be submerged into a thermoplastic matrix solution optimized for dipping. The assembly may be removed and cleaned before placing it in an oven for curing at a predetermined temperature for a certain period of time. Here, the composite insulation system is structured to cure tightly over the pipe without wrinkles. The thermoplastic matrix is structured to flow through the cover 360 and both layers of e-glass braid (330, 340). Typically, the thermoplastic matrix is continuous from the cover 360 to at last the foil 320, through all layers of the insulation system, also forming at least one interstitial layer 350. In this way, in some embodiments, the entire composite system, i.e., the component with the insulation layers, may be placed in an oven, preferably at a predetermined temperature, such as about 560° F., for a predetermined period of time, such as one hour, for curing/heat treatment. In other embodiments, only a portion of the composite system may be heat cured at a time, using an oven, heat gun, or the like. In other embodiments, the curing of the thermoset matrix may be achieved, in some instances, by heating the assembly to a predetermined temperature (for instance, temperature in the range of about 400° F., or 700-800° F., and the like), to achieve cross-linking of the individual chains of the polymer.

FIG. 7, illustrates a cross-section of another embodiment before and after curing/treatment. In this embodiment the figure 402 on the left displays the insulation system 402 with a base insulation/structural reinforcement layer 420, an interfacial layer 430, a cover 440 and a topcoat 460. On the right, the interstitial matrix distribution of the same configuration is shown after curing/treatment for example, by heating the pipe 410 along with the composite insulation to a predetermined temperature to affect the curing of the interstitial matrix substrate and the fibrous layers. Here, the matrix is typically continuous from the outside to the inside of the composite insulation system. For example, the curing of the thermoset matrix may be achieved, in some instances, by heating the assembly to a predetermined temperature (for instance, temperature in the range of about 400° F., or 700-800° F., and the like), to achieve cross-linking of the individual chains of the polymer.

FIG. 8a, displays an embodiment of the composite insulation system 10 with a molded feature. The pipe 800 or the component 800 is illustrated with a composite insulation 810. On the side of the composite insulation 810, a section or at least a portion of the outer surface of the composite insulation 810 may molded into a flat portion 820. For example, a flat molding plate (not illustrated) may be applied prior to curing, that may then be removed later on after curing. Although illustrated as flat, any desired curvilinear contour may be molded as the molded portion 820 along at least a portion of the composite insulation 810, utilizing a device with a complementary surface/contour. The molded portion, for example, the flattened area 820 is structured to provide the required external clearance during operation. FIG. 8b, displays a cross-section of the composite insulation system 10, and particularly the molded feature 820 along the section AA of FIG. 8a.

FIGS. 9a-9b, display embodiments of the invention with localized insulation portions. Localized insulation may be used to tailor the composite insulation system's performance in local areas, as desired in specific applications. FIG. 9a illustrates a cut-away view of one embodiment of a composite insulation system 950a. The composite insulation system 950a may comprise composite insulation 920 on a pipe 900 with a localized insulation mat 910a positioned at a suitable location, for example, at the outer bend of the pipe 900. FIG. 9a illustrates the system with a section of the composite insulation 920 removed to indicate the positioning of the localized insulation mat 910a between the pipe 900 and the composite insulation 920.

In one instance of the embodiment illustrated in FIG. 9a the composite insulation 920 includes a first braided layer of e-glass braid, a knit e-glass cover, and a thermoplastic substrate. During installation, the localized non-woven insulation mat 910a may be secured to the pipe with a tack adhesive. Then the e-glass braid may be applied over the pipe and localized mat. Since the e-glass braid is highly conformable, it typically snuggly covers the pipe 900 and localized mat 910a. The knit cover may be installed next. The knit cover typically provides compression over the entire system including the portions with the localized mat 910a and is structured to produce a smooth surface without any bumps or wrinkles. Clamps may then be installed next and the material outside of the clamps may be trimmed. The open ends of the pipe may be capped and the entire assembly may be submerged into a thermoplastic matrix solution optimized for dipping for predetermined a period of time to ensure that the matrix solution penetrates the e-glass braid, but not the localized insulation mat. The part may then be removed and cleaned before curing in an oven. In this embodiment, the composite insulation system typically cures tightly and rigidly around the pipe 900. The matrix may be configured to flow through cover and into the e-glass braid. Typically, the cover and e-glass braid are configured to be bonded together with a clear interfaces between the layers. The thermoplastic matrix is typically continuous from the cover to the e-glass braid. In this embodiment, the mat may be infused with the thermoplastic matrix if desired for a certain application.

FIG. 9b illustrates a cut-away view of another embodiment of a composite insulation system 950b. The composite insulation system 950b may comprise composite insulation 920 on a pipe 900 with a localized insulation sleeve 910b positioned at a suitable location, for example, at the outer bend of the pipe 900. FIG. 9b illustrates the system 950b with a section of the composite insulation 920 removed to indicate the positioning of the localized insulation sleeve 910b between the pipe 900 and the composite insulation 920. The localized insulation sleeve may comprise a braided silica sleeve. In some embodiments, the localized insulation sleeve may be installed next to the pipe 900 along the bend and dimensioned such that the sleeve 910*b* terminates before the ends of the layers above it.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A customizable, self-molding, fiber-reinforced composite insulation system that is structured to be applied to a component comprising:
   at least one structural reinforcement layer, the at least one structural reinforcement layer being structured to provide structural support, insulation or protection to the component;
   a self-molding fabric fiber cover structured to encase the at least one structural reinforcement layer and provide compression around the at least one structural reinforcement layer and at least partially around the component without application of external forces; and
   a liquid polymer matrix solution structured to be applied to the at least one structural reinforcement layer and the self-molding fiber cover positioned at least partially on the component, wherein the at least one structural reinforcement layer and the self-molding fiber cover are structured such that the liquid polymer matrix solution flows within and infuses both the at least one structural reinforcement layer and the self-molding fiber cover from the outside of the self-molding fiber cover to the inside of the at least one structural reinforcement layer, wherein the liquid polymer matrix solution is structured to be cured to thereby form a continuous matrix from the outside of the self-molding fiber cover to the inside of the at least one structural reinforcement layer.

2. The composite insulation system of claim 1, wherein the at least one structural reinforcement layer comprises structural fibers, resin fibers and/or elastic fibers, wherein:
   structural fibers comprise glass, carbon, polymer, ceramic, metallic, mineral and/or natural fibers; and
   resin fibers comprise polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and/or ethylene-tetrafluoroethylene (ETFE) based fibers.

3. The composite insulation system of claim 1, wherein the at least one structural reinforcement layer comprises braided fiber materials, knit fiber materials, woven fiber materials, and/or non-woven fiber materials.

4. The composite insulation system of claim 1, wherein the at least one structural reinforcement layer comprises polymeric films, metal films, metalized polymeric films, foils, fiber reinforced films and/or fiber reinforced foils.

5. The composite insulation system of claim 1, wherein the self-molding fiber cover comprises braided fiber materials, knit fiber materials, woven fiber materials, and/or non-woven fiber materials.

6. The composite insulation system of claim 1, wherein the self-molding fiber cover comprises structural fibers, resin fibers and/or elastic fibers, wherein:
   structural fibers comprise glass, carbon, polymer, ceramic, metallic, mineral and/or natural fibers; and
   resin fibers comprise polyethylene terephthalate (PET), polyamide (PA), polyphenylene sulfide (PPS), polyphenylene oxide ether (PPE), polyethylenimine (PEI), polyether ether ketone (PEEK), fluoric polymers such as polytetrafluoroethylene (PTFE), ethylene-tetrafluoroethylene (ETFE), polyvinylidenefluoride (PVDF), and/or ethylene-tetrafluoroethylene (ETFE) based fibers.

7. The composite insulation system of claim 1, wherein the liquid polymer matrix solution comprises a dispersion of ground thermoplastic polymer in an organic or non-organic solvent.

8. The composite insulation system of claim 1, wherein the liquid polymer matrix solution comprises one or more additives chosen from a group comprising surfactants, emulsifiers, dispersants, rheology modifiers, and functional additives.

9. The composite insulation system of claim 1, wherein the liquid polymer matrix solution comprises polyphenylene sulfide (PPS).

10. The composite insulation system of claim 1, wherein the flow of the liquid polymer matrix solution within and the at least partial infusion of the self-molding fiber cover is structured to form an interfacial area of composite between the self-molding fiber cover and the at least one structural reinforcement layer.

11. The composite insulation system of claim 1, wherein the flow of the liquid polymer matrix solution within and the at least partial infusion of the at least one structural reinforcement layer is structured to form an interfacial area of composite between a first structural reinforcement layer and a second structural reinforcement layer of the at least one structural reinforcement layer.

12. The composite insulation system of claim 1, further comprising one or more metal foil or fiber reinforced metal foil layers chosen from a group comprising aluminum, fiberglass reinforced aluminum, stainless steel, nickel, and tin.

13. The composite insulation system of claim 1 further comprising a customizable topcoat structured to be applied to the self-molding fiber cover and cured, the customizable top coat comprising one or more dry ground polymers dissolved in a solvent and an emulsifier.

14. The composite insulation system of claim 1, wherein the liquid polymer matrix solution flows between the at least one structural reinforcement layer and the self-molding fiber cover during curing to create a mechanical and chemical bond between layers of the composite system.

15. A customizable, self-molding, fiber-reinforced composite insulation system that is structured to be applied to a component comprising:
   at least one structural reinforcement layer, the at least one structural reinforcement layer being structured to provide structural support, insulation or protection to the component;
   a self-molding fiber cover structured to encase the at least one structural reinforcement layer and provide compression around the at least one structural reinforcement layer and at least partially around the component without application of external forces; and a liquid polymer matrix solution structured to be applied to the at least one structural reinforcement layer and the self-molding fiber cover positioned at least partially on the component and to be cured to thereby form the fiber-reinforced composite insulation system, wherein the liquid polymer matrix solution comprises at least one of (i) a dispersion of ground thermoplastic polymer in an organic or non-organic solvent or (ii) polyphenylene sulfide (PPS).

16. A customizable, self-molding, fiber-reinforced composite insulation system that is structured to be applied to a component comprising:

at least one structural reinforcement layer, the at least one structural reinforcement layer being structured to provide structural support, insulation or protection to the component;

a self-molding fiber cover structured to encase the at least one structural reinforcement layer and provide compression around the at least one structural reinforcement layer and at least partially around the component without application of external forces;

a liquid polymer matrix solution structured to be applied to the at least one structural reinforcement layer and the self-molding fiber cover positioned at least partially on the component and to be cured to thereby form the fiber-reinforced composite insulation system; and a customizable topcoat structured to be applied to the self-molding fiber cover and cured, the customizable top coat comprising one or more dry ground polymers dissolved in a solvent and an emulsifier.

* * * * *